US008577115B2

(12) United States Patent
Gering et al.

(10) Patent No.: US 8,577,115 B2
(45) Date of Patent: Nov. 5, 2013

(54) METHOD AND SYSTEM FOR IMPROVED IMAGE SEGMENTATION

(75) Inventors: David T. Gering, Waunakee, WI (US); Kenneth J. Ruchala, Madison, WI (US)

(73) Assignee: Tomotherapy Incorporated, Madison, WI (US)

(*) Notice: Subject to any disclaimer, the term of this patent is extended or adjusted under 35 U.S.C. 154(b) by 1255 days.

(21) Appl. No.: 12/380,829

(22) Filed: Mar. 4, 2009

(65) Prior Publication Data
US 2009/0226060 A1 Sep. 10, 2009

Related U.S. Application Data

(60) Provisional application No. 61/033,574, filed on Mar. 4, 2008.

(51) Int. Cl.
*G06K 9/00* (2006.01)

(52) U.S. Cl.
USPC .......................................................... 382/132

(58) Field of Classification Search
None
See application file for complete search history.

(56) References Cited

U.S. PATENT DOCUMENTS

| | | |
|---|---|---|
| 4,149,081 A | 4/1979 | Seppi |
| 4,998,268 A | 3/1991 | Winter |
| 5,008,907 A | 4/1991 | Norman et al. |
| 5,044,354 A | 9/1991 | Goldhorn et al. |
| 5,065,315 A | 11/1991 | Garcia |
| 5,072,384 A * | 12/1991 | Doi et al. .................... 382/132 |
| 5,117,829 A | 6/1992 | Miller et al. |
| 5,317,616 A | 5/1994 | Swerdloff et al. |
| 5,332,908 A | 7/1994 | Weidlich |
| 5,335,255 A | 8/1994 | Seppi et al. |
| 5,351,280 A | 9/1994 | Swerdloff et al. |
| 5,391,139 A | 2/1995 | Edmundson |
| 5,394,452 A | 2/1995 | Swerdloff et al. |
| 5,405,309 A | 4/1995 | Carden, Jr. |
| 5,442,675 A | 8/1995 | Swerdloff et al. |
| 5,446,548 A | 8/1995 | Gerig et al. |
| 5,471,516 A | 11/1995 | Nunan |
| 5,511,549 A | 4/1996 | Legg et al. |

(Continued)

FOREIGN PATENT DOCUMENTS

| | | |
|---|---|---|
| JP | 10052421 | 2/1998 |
| JP | 2002210029 | 7/2002 |

(Continued)

OTHER PUBLICATIONS

PCT/US2009/036057 International Search Report and Written Opinion, 10 pages, dated Sep. 30, 2009.

(Continued)

*Primary Examiner* — Sean Motsinger
(74) *Attorney, Agent, or Firm* — Michael Best & Friedrich LLP

(57) ABSTRACT

A system and method of identifying anatomical structures in a patient. The method includes the acts of acquiring an image of the patient, the image including a set of image elements; segmenting the image to categorize each image elements according to its substance; computing the probability that the categorization of each image element is correct; resegmenting the image starting with image elements that have a high probability and progressing to image elements with lower probabilities; aligning at least one of the image elements with an anatomical atlas; and fitting the anatomical atlas to the segmented image.

28 Claims, 25 Drawing Sheets
(19 of 25 Drawing Sheet(s) Filed in Color)

U.S. PATENT DOCUMENTS

| | | | |
|---|---|---|---|
| 5,528,650 A | 6/1996 | Swerdloff et al. | |
| 5,548,627 A | 8/1996 | Swerdloff et al. | |
| 5,552,605 A | 9/1996 | Arata | |
| 5,579,358 A | 11/1996 | Lin | |
| 5,596,619 A | 1/1997 | Carol | |
| 5,596,653 A | 1/1997 | Kurokawa | |
| 5,621,779 A | 4/1997 | Hughes et al. | |
| 5,622,187 A | 4/1997 | Carol | |
| 5,625,663 A | 4/1997 | Swerdloff et al. | |
| 5,633,948 A * | 5/1997 | Kegelmeyer, Jr. | 382/132 |
| 5,647,663 A | 7/1997 | Holmes | |
| 5,651,043 A | 7/1997 | Tsuyuki et al. | |
| 5,661,773 A | 8/1997 | Swerdloff et al. | |
| 5,668,371 A | 9/1997 | Deasy et al. | |
| 5,673,300 A | 9/1997 | Reckwerdt et al. | |
| 5,692,507 A | 12/1997 | Seppi et al. | |
| 5,712,482 A | 1/1998 | Gaiser et al. | |
| 5,724,400 A | 3/1998 | Swerdloff et al. | |
| 5,751,781 A | 5/1998 | Brown et al. | |
| 5,754,622 A | 5/1998 | Hughes | |
| 5,754,623 A | 5/1998 | Seki | |
| 5,760,395 A | 6/1998 | Johnstone | |
| 5,823,192 A | 10/1998 | Kalend et al. | |
| 5,835,562 A | 11/1998 | Ramsdell et al. | |
| 5,961,454 A | 10/1999 | Kooy et al. | |
| 6,178,345 B1 | 1/2001 | Vilsmeier et al. | |
| 6,385,288 B1 | 5/2002 | Kanematsu | |
| 6,393,096 B1 | 5/2002 | Carol et al. | |
| 6,560,311 B1 | 5/2003 | Shepard et al. | |
| 6,754,376 B1 * | 6/2004 | Turek et al. | 382/131 |
| 6,882,702 B2 | 4/2005 | Luo | |
| 6,950,544 B2 * | 9/2005 | Ashton | 382/131 |
| 7,259,762 B2 * | 8/2007 | Tanacs et al. | 345/424 |
| 7,367,955 B2 | 5/2008 | Zhang et al. | |
| 7,382,907 B2 * | 6/2008 | Luo et al. | 382/128 |
| 7,450,687 B2 | 11/2008 | Yeo et al. | |
| 7,492,858 B2 | 2/2009 | Partain et al. | |
| 7,536,041 B2 * | 5/2009 | Pekar et al. | 382/128 |
| 7,623,709 B2 | 11/2009 | Gering | |
| 7,639,853 B2 | 12/2009 | Olivera et al. | |
| 7,639,854 B2 | 12/2009 | Schnarr et al. | |
| 7,643,661 B2 | 1/2010 | Ruchala et al. | |
| 7,773,788 B2 | 8/2010 | Lu et al. | |
| 7,792,348 B2 * | 9/2010 | Russakoff | 382/132 |
| 7,817,836 B2 * | 10/2010 | Chao et al. | 382/131 |
| 8,140,144 B2 * | 3/2012 | Dale et al. | 600/410 |
| 2003/0035583 A1 | 2/2003 | Pelagotti et al. | |
| 2003/0139659 A1 | 7/2003 | Dale et al. | |
| 2004/0068182 A1 | 4/2004 | Misra | |
| 2004/0087850 A1 * | 5/2004 | Okerlund et al. | 600/407 |
| 2004/0161138 A1 * | 8/2004 | Ashton | 382/128 |
| 2005/0143965 A1 | 6/2005 | Failla et al. | |
| 2005/0251029 A1 | 11/2005 | Khamene et al. | |
| 2006/0285640 A1 | 12/2006 | Nizin et al. | |
| 2006/0293583 A1 | 12/2006 | Saracen et al. | |
| 2007/0014452 A1 * | 1/2007 | Suresh et al. | 382/128 |
| 2007/0041496 A1 | 2/2007 | Olivera et al. | |
| 2007/0041498 A1 | 2/2007 | Olivera et al. | |
| 2007/0049785 A1 * | 3/2007 | Pekar et al. | 600/1 |
| 2007/0081712 A1 | 4/2007 | Huang et al. | |
| 2007/0127790 A1 | 6/2007 | Lau et al. | |
| 2007/0165920 A1 | 7/2007 | Gering et al. | |
| 2007/0197908 A1 | 8/2007 | Ruchala et al. | |
| 2008/0002809 A1 | 1/2008 | Bodduluri | |
| 2008/0002811 A1 | 1/2008 | Allison | |
| 2008/0031406 A1 | 2/2008 | Yan et al. | |
| 2008/0049898 A1 | 2/2008 | Romesberg et al. | |
| 2008/0170770 A1 * | 7/2008 | Suri et al. | 382/128 |
| 2008/0193006 A1 | 8/2008 | Udupa et al. | |
| 2008/0205719 A1 * | 8/2008 | Pekar et al. | 382/128 |
| 2008/0279328 A1 | 11/2008 | Zeitler et al. | |
| 2009/0129641 A1 * | 5/2009 | Zhou | 382/128 |
| 2009/0187422 A1 * | 7/2009 | Kaus et al. | 705/2 |
| 2010/0053208 A1 | 3/2010 | Menningen et al. | |
| 2010/0054413 A1 | 3/2010 | Sobering et al. | |
| 2011/0019889 A1 | 1/2011 | Gering et al. | |

FOREIGN PATENT DOCUMENTS

| | | |
|---|---|---|
| JP | 2004166975 | 6/2004 |
| TW | 300853 | 3/1997 |
| WO | 03/076003 | 9/2003 |
| WO | 03092789 | 11/2003 |
| WO | 2005062790 | 7/2005 |
| WO | 2007079207 | 7/2007 |
| WO | WO 2007133932 A2 * | 11/2007 |

OTHER PUBLICATIONS

Purdy, James, "3D Treatment Planning and Intensity-Modulated Radiation Therapy," Oncology, vol. 13, No. 10, suppl. 5 (Oct. 1999).

Bertalmio, Marcelo, et al., "Morphing Active Contours", IEEE Transactions on Pattern Analysis and Machine Intelligence, vol. 22, No. 7, pp. 733-737, Jul. 2000.

Lee, Jason et al., "Intensity Modulated Radiation Therapy; An Introduction for Patients and Clinicians," www.oncolink.com/templates/treatment/article.cfm?c=45&s=33&id=182; Jun. 16, 2001.

Lu, W., et al., "Automatic Re-Contouring in 4D Radiotherapy", Physical Medical Biology, Mar. 7, 2006, 51 (5):1077-99.

Mackie, T. Rockwell et al., "Tomotherapy" Seminars in Radiation Oncology, vol. 9, No. 1, Jan. 1, 1999, pp. 108-117, XP002603992.

Rueckert, D.et al., "Nonrigid Registration Using Free-Form Deformations: Application to Breast MR Images", IEEE Transactions on Medical Imaging, vol. 18, No. 8, pp. 712-721, Aug. 1999.

Kikinis R. et al., "High Performance Computing (HPC) in Medical Image Analysis (MIA) at the Surgical Planning Laboratory (SPL)," http://splweb.bwh.havard.edu:8000/pages/papers/kikinis/hps/hpcfinal.html; Sep. 22, 1998.

Yezzi, et al., "A Variational Framework for Joint Segmentation and Registration", Mathematical Method in Biomedical Image Analysis, 8 pages, 2001.

Young, Yuan-Nan, et al., "Registration-Based Morphing of Active Contours for Segmentation of CT Scans", Mathematical Biosciences and Engineering, vol. 2, No. 1, pp. 79-96, Jan. 2005.

Gering D. et al. "Image Deformation Based on a Marionette Model" Medical Physics, vol. 37, No. 6, Jun. 1, 2010, p. 3127.

Keall, Paul, "4-Dimensional Computed Tomography Imaging and Treatment Planning," Seminars in Radiation Oncology, vol. 14, No. 1, Jan. 2004; pp. 81-90.

Extended Search Report from European Patent Office for Application No. 09716288.7 dated Dec. 12, 2011.

D. Gering et al., "An Automatic Contouring Method that Combines Rule-Based, Atlas-Based, and Mesh-Based Approaches," Medical Physics—2008 AAPM Meeting Program, vol. 35, No. 6, p. 2662, Jun. 2008.

Alain Pitiot et al., "Expert Knowledge-Guided Segmentation System for Brain MRI," NeuroImage, vol. 23, pp. S85-S96, Jan. 1, 2004.

E.B. Dam et al., "Automatic Morphometric Cartilage Quantification in the Medial Tibial Plateau from MRI for Osteoarthritis Grading," OsteoArthritis and Cartilage, vol. 15, No. 7, pp. 808-818, Jun. 13, 2007.

Ayman El-Baz et al., "MGRF Controlled Stochastic Deformable Model," Image Analysis; Lecture Notes in Computer Science, pp. 1138-1147, Jun. 28, 2005.

David T. Gering et al., "Recognizing Deviations from Normalcy for Brain Tumor Segmentation," Medical Image Computing and Computer-Assisted Intervention, vol. 2488, pp. 388-395, Sep. 25, 2002.

Rietzel, Eike et al., "Four-Dimensional Image-Based Treatment Planning: Target Volume Segmentation and Dose Calculation in the Presence of Respiratory Motion," International Journal of Radiation: Oncology Biology Physics, vol. 61, No. 5, pp. 1535-1550 (Apr. 1, 2005).

Office Action from Chinese Patent Office for Application No. 200980107817.6 dated Dec. 23, 2011.

Search Report from European Patent Office for Application No. 09716288.7 dated Jun. 11, 2012.

* cited by examiner

METHOD AND SYSTEM FOR IMPROVED IMAGE SEGMENTATION

RELATED APPLICATIONS

This application claims priority to U.S. Provisional Patent Application No. 61/033,574, filed on Mar. 4, 2008, titled METHODS FOR IMPROVED IMAGE SEGMENTATION, the entire contents of which are incorporated herein by reference.

BACKGROUND

Over the past decades improvements in computers and networking, radiation therapy treatment planning software, and medical imaging modalities (CT, MRI, US, and PET) have been incorporated into radiation therapy practice. These improvements have led to the development of image guided radiation therapy ("IGRT"). IGRT is radiation therapy that uses cross-sectional images of the patient's internal anatomy to better target the radiation dose in the tumor while reducing the radiation exposure to healthy organs. The radiation dose delivered to the tumor is controlled with intensity modulated radiation therapy ("IMRT"), which involves changing the size, shape, and intensity of the radiation beam to conform to the size, shape, and location of the patient's tumor. IGRT and IMRT lead to improved control of the tumor while simultaneously reducing the potential for acute side effects due to irradiation of healthy tissue surrounding the tumor.

SUMMARY

An important factor in the delivery of image guided radiation therapy is the quality of the image used to plan and deliver the radiation therapy, and particularly, the accuracy with which structures in the image are identified. For CT images, the data comprising the patient images are composed of image elements, which represent image elements stored as data in the system. These image elements may be any data construct used to represent image data, including two-dimensional pixels or three-dimensional image elements. In order to accurately construct the patient image, the image elements are subjected to a process called segmentation. Segmentation categorizes each element as being one of four different substances in the human body. These four substances are air, fat, muscle and bone.

In one embodiment, the invention provides a method of identifying anatomical structures in a patient. The method comprises acquiring an image of the patient, wherein the image is comprised of a set of image elements. The method further comprises segmenting the image to categorize at least some image elements according to their substance, aligning segmented image with a probabilistic atlas, computing the probability that the categorization of the image elements is correct, and resegmenting the image emphasizing image elements based on their probabilities.

In another embodiment, the invention provides a radiation therapy system, and a method of automatically identifying anatomical structures in a patient using the radiation therapy system. The method comprises acquiring an image of the patient, segmenting the image using a hierarchical series of image processing steps to identify landmarks in the image, and identifying the anatomical structures using the landmarks.

In still another embodiment, the invention provides a method of segmenting an image of a patient to identify the tissue class of each image element in the image. The method comprises analyzing each image element using a set of rules to determine a probability of each image element being a given tissue class, aligning an anatomical atlas to the image and refining the tissue probabilities of each image element, and fitting a mesh to the image elements based on the probabilities, the mesh representing a structural model of an organ and establishing an expected shape of an organ.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
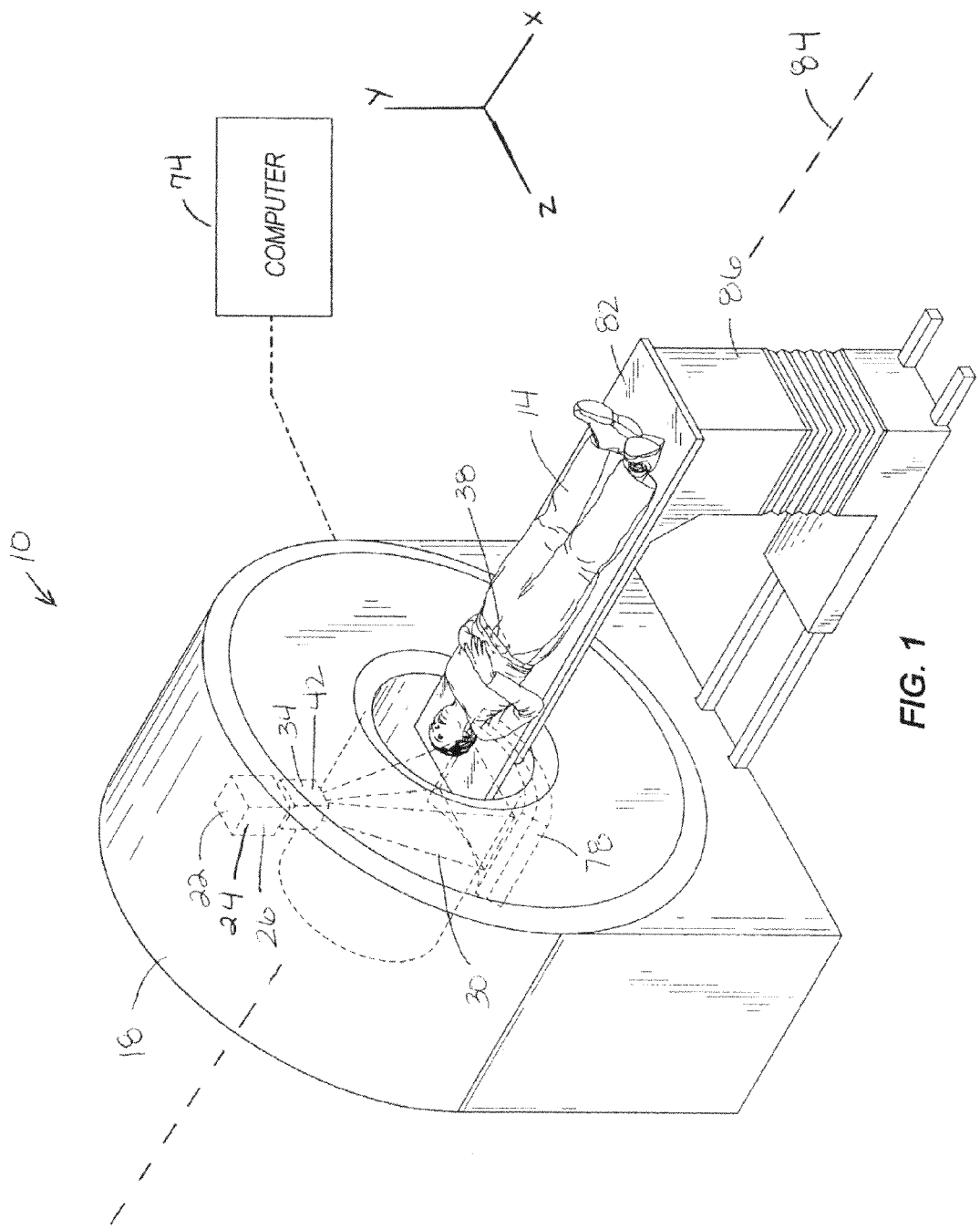
FIG. 1 is a perspective view of a radiation therapy treatment system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Although directional references, such as upper, lower, downward, upward, rearward, bottom, front, rear, etc., may be made herein in describing the drawings, these references are made relative to the drawings (as normally viewed) for convenience. These directions are not intended to be taken literally or limit the present invention in any form. In addition, terms such as "first", "second", and "third" are used herein for purposes of description and are not intended to indicate or imply relative importance or significance.

In addition, it should be understood that embodiments of the invention include both hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

FIG. 1 illustrates a radiation therapy treatment system 10 that can provide radiation therapy to a patient 14. The radiation therapy treatment can include photon-based radiation therapy, brachytherapy, electron beam therapy, proton, neutron, or particle therapy, or other types of treatment therapy. The radiation therapy treatment system 10 includes a gantry 18. The gantry 18 can support a radiation module 22, which can include a radiation source 24 and a linear accelerator 26 operable to generate a beam 30 of radiation. Though the gantry 18 shown in the drawings is a ring gantry, i.e., it extends through a full 360° arc to create a complete ring or circle, other types of mounting arrangements may also be employed. For example, a non-ring-shaped gantry, such as a C-type, partial ring gantry, or robotic arm could be used. Any other framework capable of positioning the radiation module 22 at various rotational and/or axial positions relative to the patient 14 may also be employed. In addition, the radiation source 24 may travel in path that does not follow the shape of the gantry 18. For example, the radiation source 24 may travel in a non-circular path even though the illustrated gantry 18 is generally circular-shaped.

The radiation module 22 can also include a modulation device 34 operable to modify or modulate the radiation beam 30. The modulation device 34 provides the modulation of the radiation beam 30 and directs the radiation beam 30 toward the patient 14. Specifically, the radiation beam 34 is directed toward a portion of the patient. Broadly speaking, the portion may include the entire body, but is generally smaller than the entire body and can be defined by a two-dimensional area and/or a three-dimensional volume. A portion desired to receive the radiation, which may be referred to as a target 38 or target region, is an example of a region of interest. Another type of region of interest is a region at risk. If a portion includes a region at risk, the radiation beam is preferably diverted from the region at risk. The patient 14 may have more than one target region that needs to receive radiation therapy. Such modulation is sometimes referred to as intensity modulated radiation therapy ("IMRT").

Figure 2:
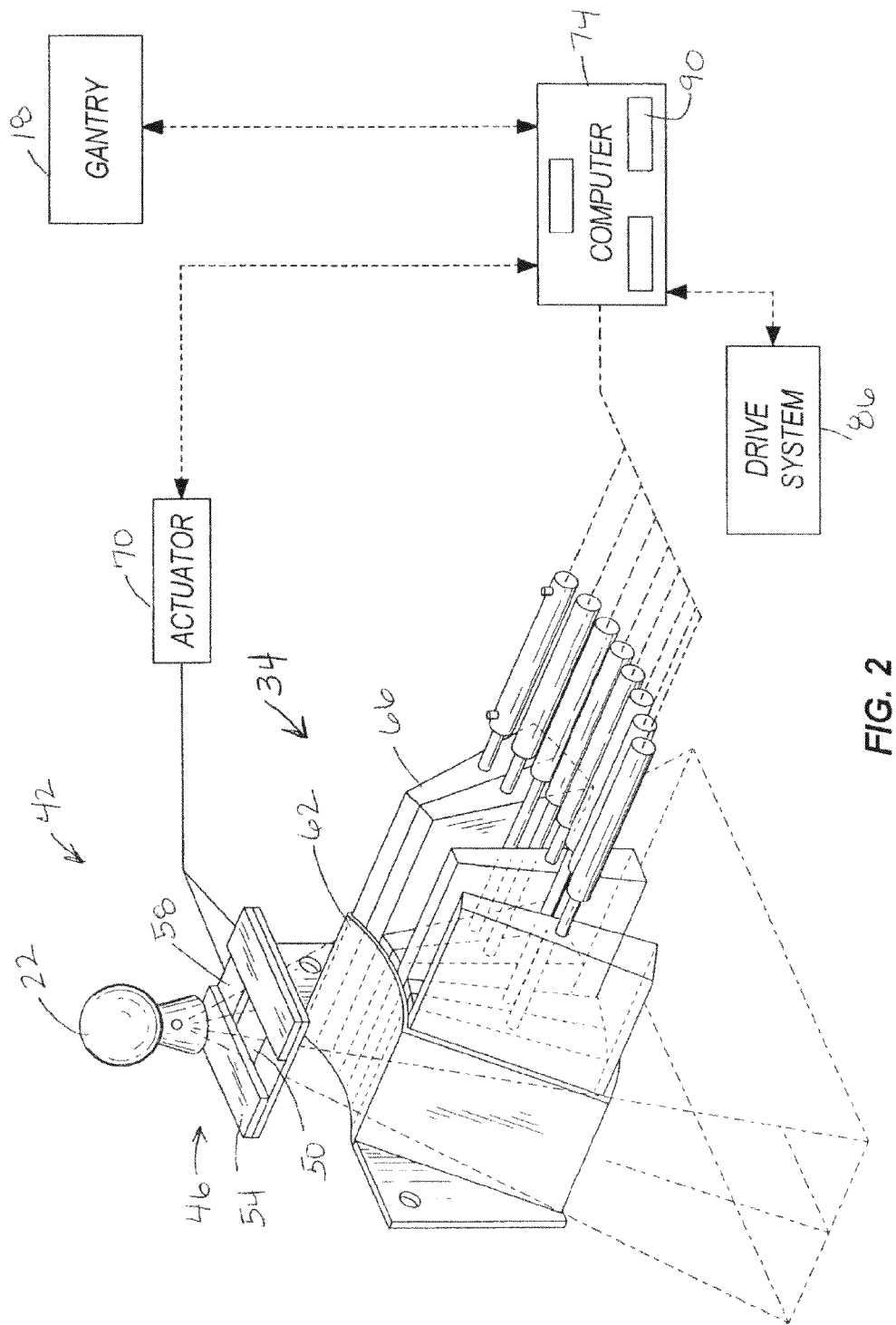
FIG. 2 is a perspective view of a multi-leaf collimator that can be used in the radiation therapy treatment system illustrated in FIG. 1.

The modulation device 34 can include a collimation device 42 as illustrated in FIG. 2. The collimation device 42 includes a set of jaws 46 that define and adjust the size of an aperture 50 through which the radiation beam 30 may pass. The jaws 46 include an upper jaw 54 and a lower jaw 58. The upper jaw 54 and the lower jaw 58 are moveable to adjust the size of the aperture 50.

In one embodiment, and illustrated in FIG. 2, the modulation device 34 can comprise a multi-leaf collimator 62, which includes a plurality of interlaced leaves 66 operable to move from position to position, to provide intensity modulation. It is also noted that the leaves 66 can be moved to a position anywhere between a minimally and maximally-open position. The plurality of interlaced leaves 66 modulate the strength, size, and shape of the radiation beam 30 before the radiation beam 30 reaches the target 38 on the patient 14.

Each of the leaves 66 is independently controlled by an actuator 70, such as a motor or an air valve so that the leaf 66 can open and close quickly to permit or block the passage of radiation. The actuators 70 can be controlled by a computer 74 and/or controller.

The radiation therapy treatment system 10 can also include a detector 78, e.g., a kilovoltage or a megavoltage detector, operable to receive the radiation beam 30. The linear accelerator 26 and the detector 78 can also operate as a computed tomography (CT) system to generate CT images of the patient 14. The linear accelerator 26 emits the radiation beam 30 toward the target 38 in the patient 14. The target 38 absorbs some of the radiation. The detector 78 detects or measures the amount of radiation absorbed by the target 38. The detector 78 collects the absorption data from different angles as the linear accelerator 26 rotates around and emits radiation toward the patient 14. The collected absorption data is transmitted to the computer 74 to process the absorption data and to generate images of the patient's body tissues and organs. The images can also illustrate bone, soft tissues, and blood vessels.

The CT images can be acquired with a radiation beam 30 that has a fan-shaped geometry, a multi-slice geometry or a cone-beam geometry. In addition, the CT images can be acquired with the linear accelerator 26 delivering megavoltage energies or kilovoltage energies. It is also noted that the acquired CT images can be registered with previously acquired CT images (from the radiation therapy treatment system 10 or other image acquisition devices, such as other CT scanners, MRI systems, and PET systems). For example, the previously acquired CT images for the patient 14 can include identified targets 38 made through a contouring process. The newly acquired CT images for the patient 14 can be registered with the previously acquired CT images to assist in identifying the targets 38 in the new CT images. The registration process can use rigid or deformable registration tools.

The image data can be presented on a video display as either a three-dimensional image or a series of two-dimensional images. In addition, the image data comprising the images can be either voxels (for three-dimensional images) or pixels (for two-dimensional images). The term image element is used generally in the description to refer to both.

In some embodiments, the radiation therapy treatment system 10 can include an x-ray source and a CT image detector. The x-ray source and the CT image detector operate in a similar manner as the linear accelerator 26 and the detector 78 as described above to acquire image data. The image data is transmitted to the computer 74 where it is processed to generate images of the patient's body tissues and organs.

The radiation therapy treatment system 10 can also include a patient support, such as a couch 82 (illustrated in FIG. 1), which supports the patient 14. The couch 82 moves along at least one axis 84 in the x, y, or z directions. In other embodiments of the invention, the patient support can be a device that is adapted to support any portion of the patient's body. The patient support is not limited to having to support the entire patient's body. The system 10 also can include a drive system 86 operable to manipulate the position of the couch 82. The drive system 86 can be controlled by the computer 74.

Figure 3:
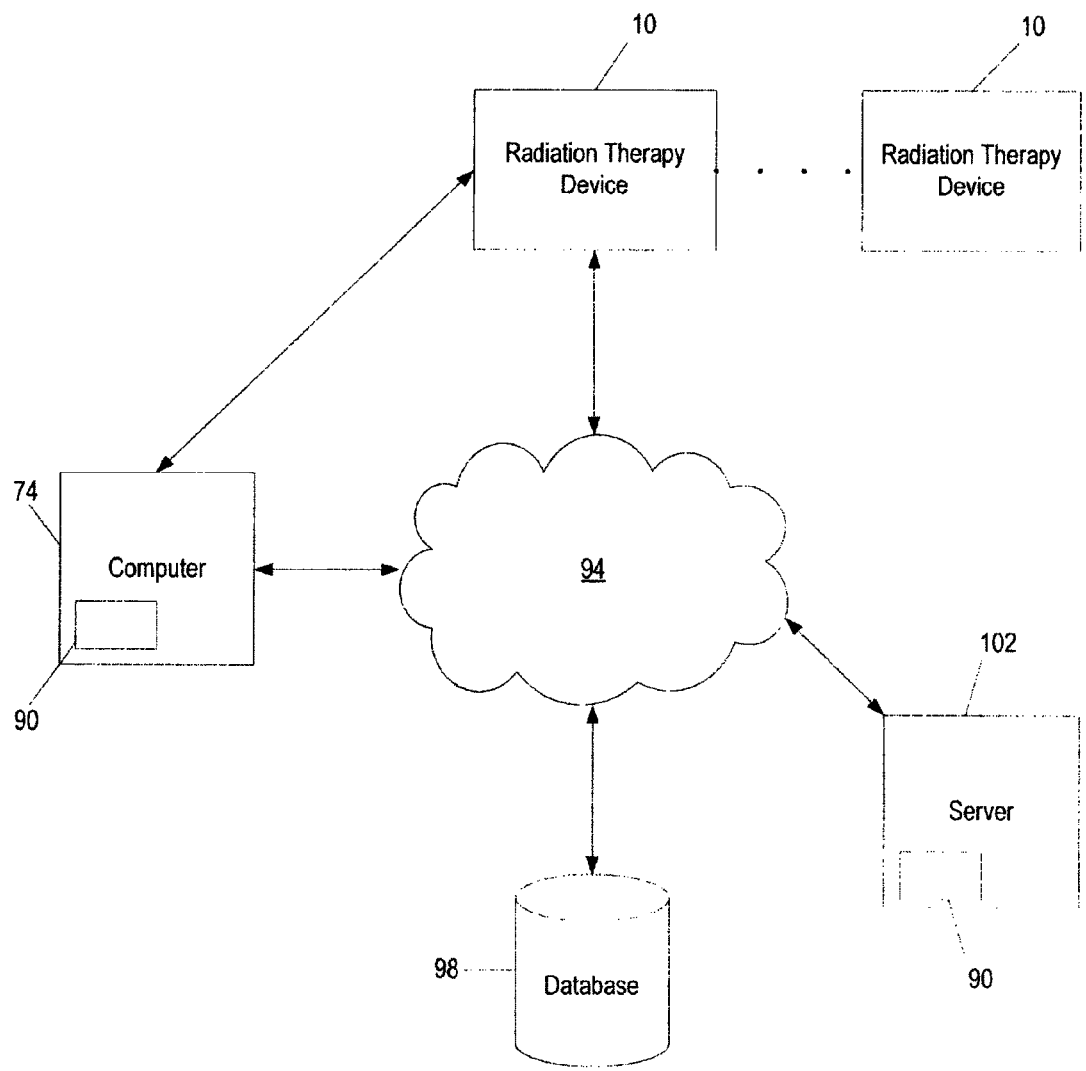
FIG. 3 is a schematic illustration of the radiation therapy treatment system of FIG. 1.

The computer 74, illustrated in FIGS. 2 and 3, includes an operating system for running various software programs and/or a communications application. In particular, the computer 74 can include a software program(s) 90 that operates to communicate with the radiation therapy treatment system 10. The computer 74 can include any suitable input/output device adapted to be accessed by medical personnel. The computer 74 can include typical hardware such as a processor, I/O interfaces, and storage devices or memory. The computer 74 can also include input devices such as a keyboard and a mouse. The computer 74 can further include standard output devices, such as a monitor. In addition, the computer 74 can include peripherals, such as a printer and a scanner.

The computer 74 can be networked with other computers 74 and radiation therapy treatment systems 10. The other computers 74 may include additional and/or different computer programs and software and are not required to be identical to the computer 74, described herein. The computers 74 and radiation therapy treatment system 10 can communicate with a network 94. The computers 74 and radiation therapy treatment systems 10 can also communicate with a database(s) 98 and a server(s) 102. It is noted that the software program(s) 90 could also reside on the server(s) 102.

The network 94 can be built according to any networking technology or topology or combinations of technologies and topologies and can include multiple sub-networks. Connections between the computers and systems shown in FIG. 3 can be made through local area networks ("LANs"), wide area networks ("WANs"), public switched telephone networks ("PSTNs"), wireless networks, Intranets, the Internet, or any other suitable networks. In a hospital or medical care facility, communication between the computers and systems shown in FIG. 3 can be made through the Health Level Seven ("HL7") protocol or other protocols with any version and/or other required protocol. HL7 is a standard protocol which specifies the implementation of interfaces between two computer applications (sender and receiver) from different vendors for electronic data exchange in health care environments. HL7 can allow health care institutions to exchange key sets of data from different application systems. Specifically, HL7 can define the data to be exchanged, the timing of the interchange, and the communication of errors to the application. The formats are generally generic in nature and can be configured to meet the needs of the applications involved.

Communication between the computers and systems shown in FIG. 3 can also occur through the Digital Imaging and Communications in Medicine (DICOM) protocol with any version and/or other required protocol. DICOM is an international communications standard developed by NEMA that defines the format used to transfer medical image-related data between different pieces of medical equipment. DICOM RT refers to the standards that are specific to radiation therapy data.

The two-way arrows in FIG. 3 generally represent two-way communication and information transfer between the network 94 and any one of the computers 74 and the systems 10 shown in FIG. 3. However, for some medical and computerized equipment, only one-way communication and information transfer may be necessary.

The software program 90 includes a plurality of modules that communicate with one another to perform functions of the radiation therapy treatment process. The various modules communication with one another to determine if delivery of the radiation therapy treatment plan occurred as intended.

The software program 90 includes a treatment plan module 106 operable to generate a treatment plan for the patient 14 based on data input to the system 10 by medical personnel. The data includes one or more images (e.g., planning images and/or pre-treatment images) of at least a portion of the patient 14. The treatment plan module 106 separates the treatment into a plurality of fractions and determines the radiation dose for each fraction or treatment based on the prescription input by medical personnel. The treatment plan module 106 also determines the radiation dose for the target 38 based on various contours drawn around the target 38. Multiple targets 38 may be present and included in the same treatment plan.

The software program 90 also includes a patient positioning module 110 operable to position and align the patient 14 with respect to the isocenter of the gantry 18 for a particular treatment fraction. While the patient is on the couch 82, the patient positioning module 110 acquires an image of the patient 14 and compares the current position of the patient 14 to the position of the patient in a reference image. The reference image can be a planning image, any pre-treatment image, or a combination of a planning image and a pre-treatment image. If the patient's position needs to be adjusted, the patient positioning module 110 provides instructions to the drive system 86 to move the couch 82 or the patient 14 can be manually moved to the new position. In one construction, the patient positioning module 110 can receive data from lasers positioned in the treatment room to provide patient position data with respect to the isocenter of the gantry 18. Based on the data from the lasers, the patient positioning module 110 provides instructions to the drive system 86, which moves the couch 82 to achieve proper alignment of the patient 14 with respect to the gantry 18. It is noted that devices and systems, other than lasers, can be used to provide data to the patient positioning module 110 to assist in the alignment process.

The patient positioning module 110 also is operable to detect and/or monitor patient motion during treatment. The patient positioning module 110 may communicate with and/or incorporate a motion detection system 112, such as x-ray, in-room CT, laser positioning devices, camera systems, spirometers, ultrasound, tensile measurements, chest bands, and the like. The patient motion can be irregular or unexpected, and does not need to follow a smooth or reproducible path.

The software program 90 also includes a treatment delivery module 114 operable to instruct the radiation therapy treatment system 10 to deliver the treatment plan to the patient 14 according to the treatment plan. The treatment delivery module 114 can generate and transmit instructions to the gantry 18, the linear accelerator 26, the modulation device 34, and the drive system 86 to deliver radiation to the patient 14. The instructions coordinate the necessary movements of the gantry 18, the modulation device 34, and the drive system 86 to deliver the radiation beam 30 to the proper target in the proper amount as specified in the treatment plan.

The treatment delivery module 114 also calculates the appropriate pattern, position, and intensity of the radiation beam 30 to be delivered, to match the prescription as specified by the treatment plan. The pattern of the radiation beam 30 is generated by the modulation device 34, and more particularly by movement of the plurality of leaves in the multi-leaf collimator. The treatment delivery module 114 can utilize canonical, predetermined or template leaf patterns to generate the appropriate pattern for the radiation beam 30 based on the treatment parameters. The treatment delivery module 114 can also include a library of patterns for typical cases that can be accessed in which to compare the present patient data to determine the pattern for the radiation beam 30.

The software program 90 also includes a feedback module 118 operable to receive data from the radiation therapy treatment system 10 during a patient treatment. The feedback module 118 can receive data from the radiation therapy treatment device and can include information related to patient transmission data, ion chamber data, MLC data, system temperatures, component speeds and/or positions, flow rates, etc. The feedback module 118 can also receive data related to the treatment parameters, amount of radiation dose the patient received, image data acquired during the treatment, and patient movement. In addition, the feedback module 118 can receive input data from a user and/or other sources. The feedback module 118 acquires and stores the data until needed for further processing.

The software program 90 also includes an analysis module 122 operable to analyze the data from the feedback module 118 to determine whether delivery of the treatment plan occurred as intended and to validate that the planned delivery is reasonable based on the newly-acquired data. The analysis module 122 can also determine, based on the received data and/or additional inputted data, whether a problem has occurred during delivery of the treatment plan. For example, the analysis module 122 can determine if the problem is related to an error of the radiation therapy treatment device 10, an anatomical error, such as patient movement, and/or a clinical error, such as a data input error. The analysis module 122 can detect errors in the radiation therapy treatment device 10 related to the couch 82, the device output, the gantry 18, the multi-leaf collimator 62, the patient setup, and timing errors between the components of the radiation therapy treatment device 10. For example, the analysis module 122 can determine if a couch replacement was performed during planning, if fixation devices were properly used and accounted for during planning, if position and speed is correct during treatment. The analysis module 122 can determine whether changes or variations occurred in the output parameters of the radiation therapy treatment device 10. With respect to the gantry 18, the analysis module 122 can determine if there are errors in the speed and positioning of the gantry 18. The analysis module 122 can receive data to determine if the multi-leaf collimator 62 is operating properly. For example, the analysis module 122 can determine if the leaves 66 move at the correct times, if any leaves 66 are stuck in place, if leaf timing is properly calibrated, and whether the leaf modulation pattern is correct for any given treatment plan. The analysis module 122 also can validate patient setup, orientation, and position for any given treatment plan. The analysis module 122 also can validate that the timing between the gantry 18, the couch 62, the linear accelerator 26, the leaves 66 are correct.

Figure 4:
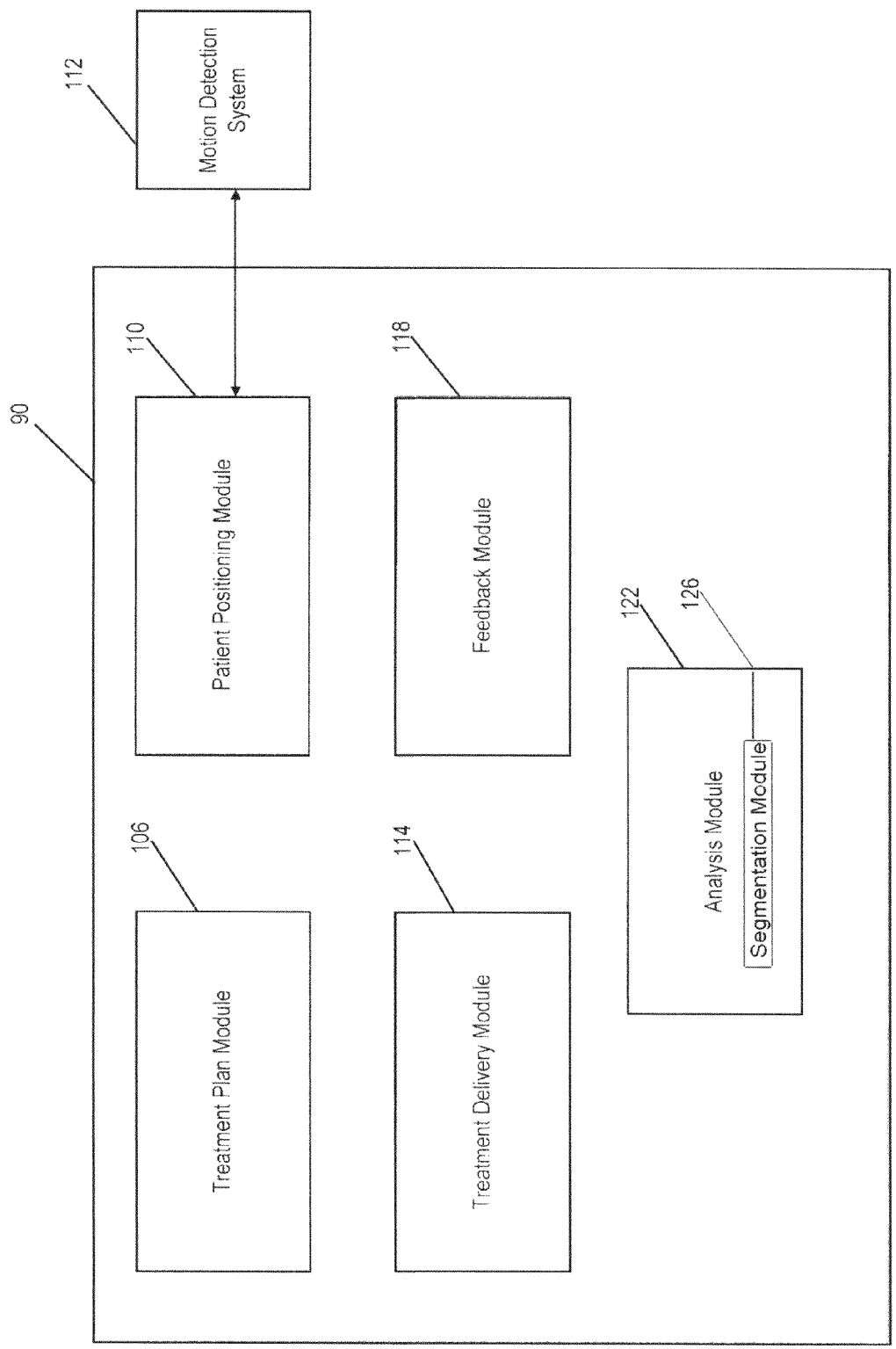
FIG. 4 is a schematic diagram of a software program used in the radiation therapy treatment system.

The software program 90 also includes a segmentation module 126, for effecting segmentation of the images acquired by the radiation therapy treatment system. The segmentation module 126 may be a stand-alone software module or may be integrated with the treatment plan module 106, the patient positioning module 110, the treatment plan module 114, the feedback module 118 or the analysis module 122. Moreover, the segmentation module 126 may be stored on and implemented by computer 74, or can be stored in database(s) 98 and accessed through network 94. In the embodiment shown in FIG. 4, the segmentation module 126 is identified as part of the analysis module 122.

Figure 5:
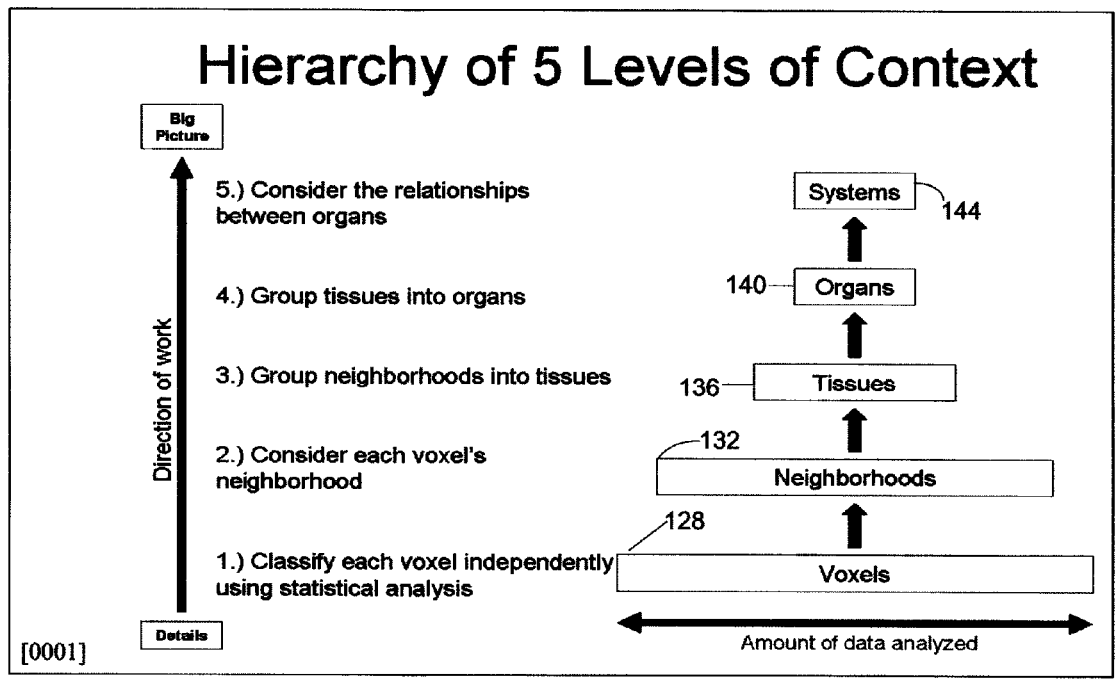
FIG. 5 is a schematic illustration of the hierarchical steps of a segmentation process embodying the invention.

The segmentation module 126 automates the task of contouring tissues and organs in the image in order to develop a radiation treatment plan. In general terms, the segmentation module effects a 5-layer hierarchy (FIG. 5) of segmentation steps that first analyzes each image element individually (the image element or voxel layer 128), then analyzes neighborhoods or groups of image elements collectively (the neighborhood layer 132), organizes them into tissue groups (the tissue layer 136), then organs (the organ layer 140) and finally organ systems (the systems layer 144). The 5-layer hierarchy of steps combines rule-based, atlas-based and mesh-based approaches to segmentation in order to achieve both recognition and delineation of anatomical structures, thereby defining the complete image as well as the details within the image. Such a framework (where local decisions are supported by global properties) is useful in addressing inconsistent segmentation or image results, such as, for example, may be encountered when there exists inconsistent rectum contents from image to image, or from image slice to image slice.

Figures 6, 7:
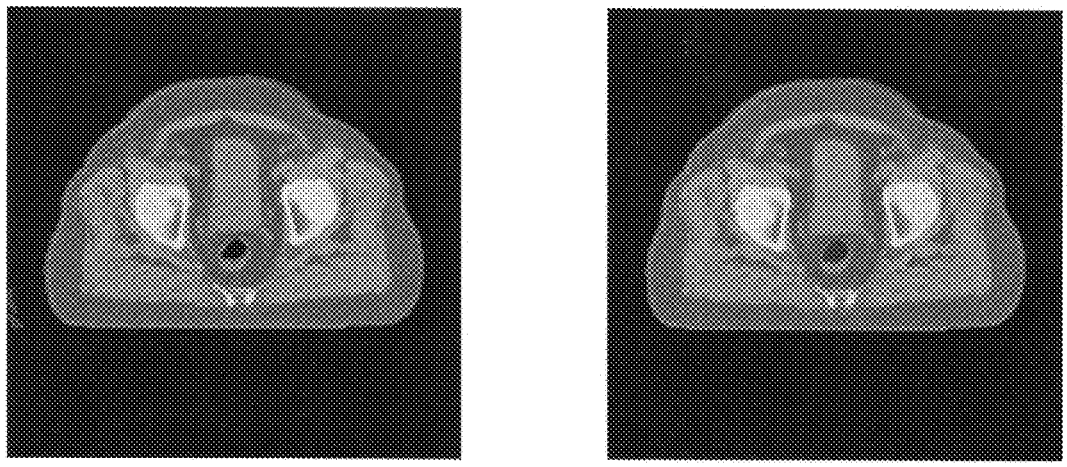
FIG. 6 is shows a pair of images after applying a binary mask threshold (left) and then performing morphological operations on the image (right).
FIG. 7 illustrates the results (right) of performing connected component analysis on a binary mask with 4 islands (left).

The first step in the hierarchy is to analyze each image element independently, unrelated to its surroundings. The analysis is called the image element layer or voxel layer 128, and involves a probabilistic framework where the CT intensity value found at each image element is treated as an independent statistical event. The first step in this analysis is to define the outer boundary of the patient's body and eliminate from the image the couch and air exterior to the patient's body. The segmentation module computes a mask used to restrict all subsequent processing of the 5-layer hierarchy to occur only within the body or region of interest (ROI). This saves processing time and avoids confusion by analyzing and displaying only relevant information. The ROI is found by performing bimodal histogram analysis to find the threshold level that separates body from background. The binary mask is generated by assigning any image elements with a CT number above this threshold a value of 1, and all other image elements a value of 0. After applying this threshold to the CT scan, morphological operations such as closing (dilation and erosion of the binary mask) and opening (erosion followed by dilation), and connected-component analysis (CCA) are used to fill any holes and remove any isolated specks that may have survived the threshold. FIG. 6 displays the intermediate results of following these steps.

The CCA is computed very efficiently using recursive search. The definition of a connected component is the set of image elements in which each image element is connected to all other image elements in the set. The result is an image where the image elements have been relabeled with an index identifying the component to which they belong, as shown in FIG. 7. This image can then be efficiently analyzed to perform various operations, such as counting the area of each "island", removing islands smaller than a given minimum area, selecting the largest island, and so on.

The image elements are then subject to a probabilistic analysis framework using Bayesian classification to create a statistical inference regarding the tissue that each image element represents. Given a set of competing hypotheses, H, and a set of data, d, a hypothesis, $h_{MAP}$, is selected which best fits the data. In radiotherapy planning, the set of hypotheses, H, is the set of tissue classes (e.g.: air, fat, muscle, vessel, bone). The data, d, are the CT image intensity values. The process of selecting a winning hypothesis is carried out at each image element, and is found by computing the a posteriori probability for each tissue class and selecting the class associated with the maximum a posteriori (MAP) probability. Baye's rule allows computation of the unknown a posteriori probabilities, p(h|d) as the product of two known quantities, the likelihood, p(d|h) and the a priori probability, p(h).

$$h_{MAP} = \underset{h \in H}{\operatorname{argmax}} p(h \mid d)$$

$$h_{MAP} = \underset{h \in H}{\operatorname{argmax}} p(d \mid h) * p(h)$$

The likelihoods express the odds of observing certain data, given that a specific hypothesis is true. The priors express what is known prior to observing the data. Both the likelihoods and the priors can be estimated from a set of training data.

Figure 8:
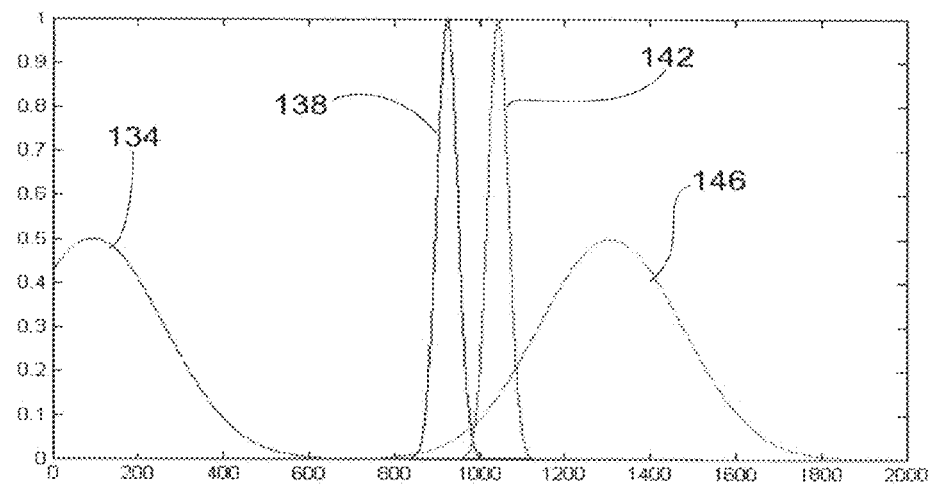
FIG. 8 is a graph of the Gaussian distribution associated with each tissue class of a prostate data set.

The likelihood, p(d|h), is the probability that the CT number will be a certain value given a certain type of tissue. It is appropriate to model imaging noise with a Gaussian distribution, so the likelihoods in this application will be Gaussian probability distribution functions (PDF). The parameters of the distribution, mean and variance, can be measured from training data. FIG. 8 displays the results of such a measurement. The curve 134 represents air, the curve 138 represents fat, the curve 142 represents muscle and the curve 146 represents bone.

In the absence of training data, the mean and variance of each tissue class can be roughly estimated from the histogram of the CT scan. A histogram is a plot, over the range of possible CT values, of the number of image elements with that value. The segmentation module 126 first separates the combined peak for fat and muscle from the peaks for air and bone, and subsequently separates fat from muscle. Inherent in the histogram, are not just the likelihoods (which govern the center and breadth of each peak), but also the priors (which scales the heights of the peaks).

The probability densities of the previous section were estimated, not determined. Given the general form of the densities (Gaussian), their governing parameters can be estimated to maximize the likelihood of the observed data. However, if there is data that is missing, hidden, or represented by latent random variables, the probability densities are difficult at best to estimate, since one cannot compute the likelihood of unseen data. Instead, the segmentation module 126 computes the expected value, and maximizes this expectation. A process referred to as expectation-maximization (EM).

Figure 9:
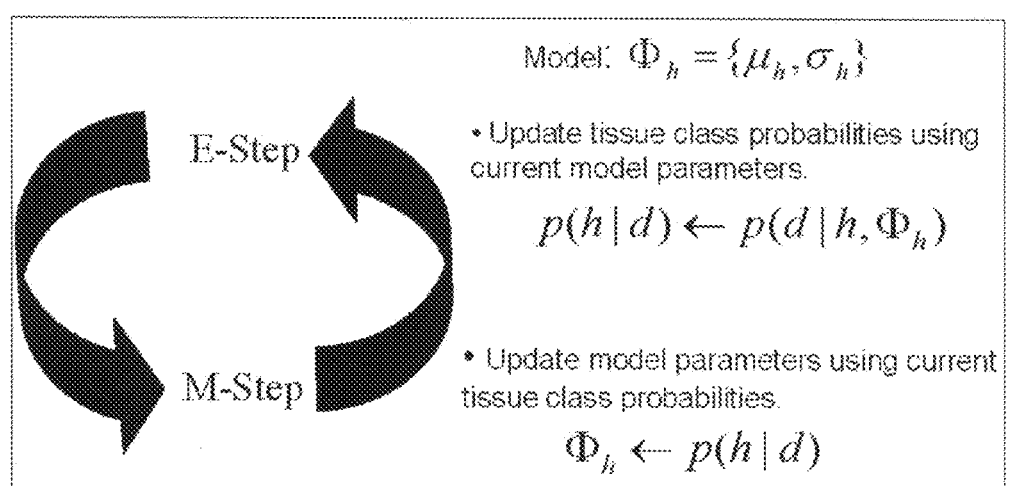
FIG. 9 is an illustration showing the process of conducting the estimation-maximization calculations to iteratively update the model parameters based on the calculated probabilities, and recalculate the probabilities based on the updated model parameters.

The segmentation module 126 applies EM to improve the results of the Bayesian classification. The visible variables are the CT image intensities, the hidden variables are the tissue classifications, and the parameters govern the tissue intensity distributions. This forms an adaptive classification that iterates between segmenting using the statistical model (mean and variance of each class), and re-estimating the model based on the previous segmentation. These two steps, the E-step and the M-step, are depicted in FIG. 9. Each iteration of the process improves the convergence between the statistical model and the previous segmentation results. For CT data, empirical evidence indicates satisfactory convergence within 3 iterations.

To make the estimation of model parameters more robust, the implementation of the M-step preferably ignores image elements expected to contain partial volume artifacts. Candidates are identified as those image elements surrounded by bone, since marrow intensities can masquerade as muscle and fat in CT scans.

Similar to the likelihoods, the priors, p(h), can be measured directly from training data. For example, the prior probability of a given tissue class can be calculated by counting the number of instances of that tissue class, and then dividing by the total number of image elements. Such a prior is referred to as a stationary prior.

Figure 10:
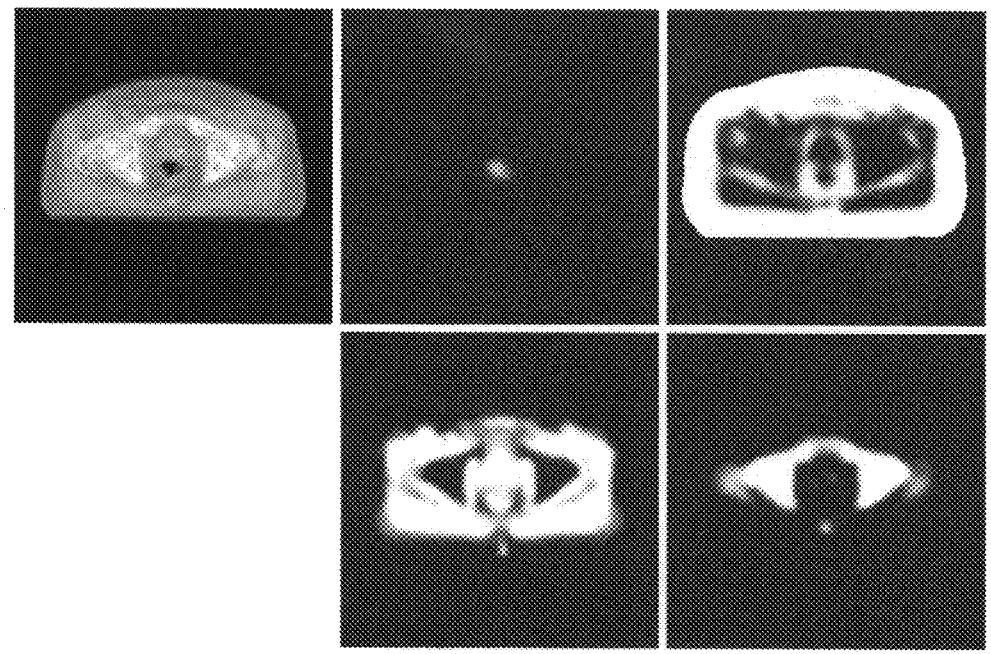
FIG. 10 is a set of spatially varying priors including a mean image (top left), probability of air (top middle), probability of fat (top right), probability of muscle (bottom left) and probability of bone (bottom right).

Alternatively, a spatially varying prior (SVP) expresses the probability of each tissue class occurring at a given spatial location. The SVP is one component of the statistical probabilistic atlas used for segmentation within this framework. The atlas is computed from training data by aligning all the CT scans within a population. The average of these registered scans is the mean image. The SVP is generated by adding, at each image element location, the number of scans in which the tissue occurs there. To be a probability, the counts are normalized so that the sum over all classes equals "1". An example of an SVP constructed from a series of prostate cases is shown in FIG. 10. The frames shown in FIG. 10 represent the mean image (top left), probability of air (top center), probability of fat (top right), probability of muscle (bottom left) and probability of bone (bottom right). In practice, an SVP constructed from a small training set may need to be blended with a stationary prior (SP) for robustness. In the embodiment shown and described, the segmentation module 126 uses a 90/10 ratio of SVP/SP. In one embodiment, the atlas can be modified based on new patient data acquired before, during or after treatment. Moreover, the probabilities established for any given image element can be modified based on new patient data or patient specific data acquired before, during or after treatment. This patient specific data may include kilovoltage CT, megavoltage CT, MRI, or PET scans. To modify the SVP using new CT scans, the scans are first segmented, and then included in the averaging process described above, whereby the new scans are given favorable weighting. The most extreme case of weighted averaging is to ignore the population entirely, giving full weight to the new scan. For example, the patient's kilovoltage CT can be used alone to generate the SVP for use in segmenting the patient's megavoltate CT. One way to accomplish this is to segment the kilovoltage CT to produce a binary mask (0's and 1's) for each tissue class, then blur each mask, such as with Gaussian smoothing and normalize the results so that the sum over all masks at each voxel location is 1. Another method is to blur by various amounts, depending on the spatial location. For example, more anatomical changes are expected to occur day-to-day in the vicinity of the rectum. Such spatially-varying changes can be derived from either qualitative estimates or quantitative measurements of training data. To measure changes over time, the training set would consist of a set of serially acquired scans for each patient in a population.

Figure 11:
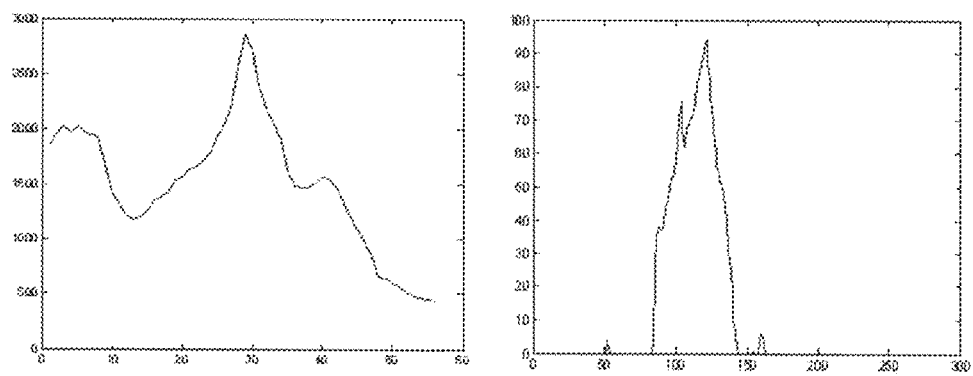
FIG. 11 are plots of bone segmentation profiles in the inferior-superior (left) and posterior-anterior (right) directions.

Before the SVP, or any atlas component, can be applied, it must first be registered to the CT scan to be analyzed. Thus, the segmentation module 126 registers the atlas to the CT image in real-time by matching bone profiles. A bone profile is a graph of the number of image elements in a slice that represent bone versus the slice number. It is sufficient to use the bone profile to find the translation in the inferior-superior and posterior-anterior directions. FIG. 11 illustrates typical bone profiles for prostate image data. Bone profiles for other parts of the body of course will differ. The translation in the left-right direction (nearly always nil due to the need to be centered in a CT scanner) and the scale in the left-right direction can be computed trivially from the bounding box of the body ROI.

The second layer of the segmentation module hierarchy of segmentation steps considers each image element as situated within its immediate neighborhood. The steps are generally referred to as the neighborhood layer 132 and resolve some of the residual ambiguity remaining after classifying image elements strictly on the basis of visual, rather than spatial, information.

The neighborhood layer 132 computes properties of continuous sections of tissue, referred to as objects, leaving no errant holes in the tissue. In other words, the process makes assumptions regarding the piecewise homogeneity of tissues. The effect is to reduce noise in the image.

The first step in the neighborhood layer 132 is to introduce contextual constraints using a probabilistic model referred to as a Markov random field (MRF). MRFs conveniently model the influence between image elements systematically using rational principles rather than ad hoc heuristics. In other words, the MRF models the joint probability distribution of the image elements in relation to other image elements. The segmentation module 126 models the likelihood of image element classifications in the form of conditional probability distributions $P(w_i|w_{S-(i)})$ relating the classification of a given image element $w_i$ to its surroundings (every other image element in the image) $w_{S-(i)}$. Markovinaity allows the computation to be tractable by asserting that a variable's intensity on all other sites is equivalent to its dependency on only its neighbors, $w_N$. Mathematically, this is shown as: $P(w_i|w_{S-\{i\}}) = P(w_i|w_{N_i})$.

Figure 12:
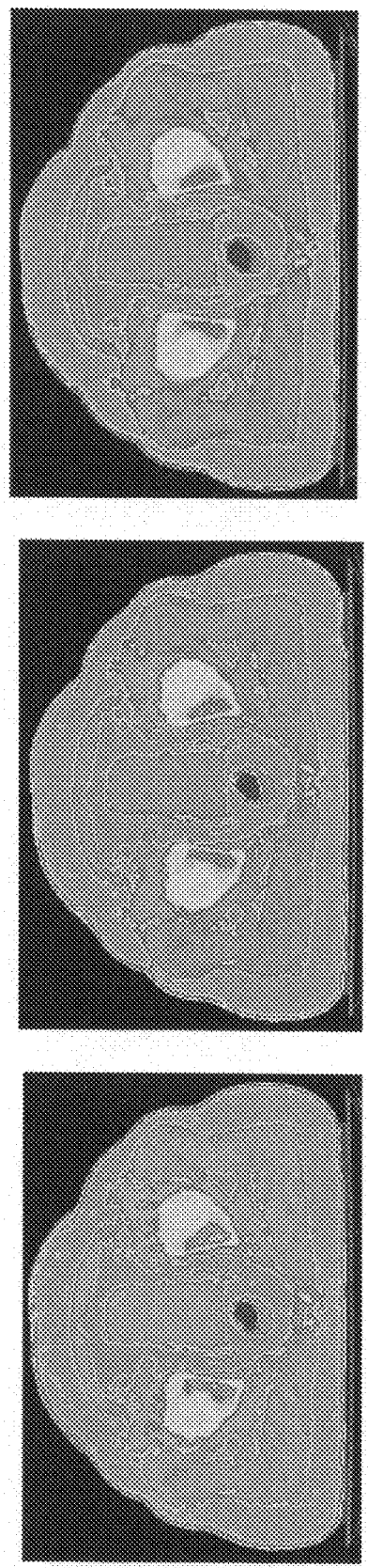
FIG. 12 shows the image after the image element layer of the segmentation hierarchy and without the application of a spatially varying prior (left), including the application of the spatially varying prior (center), and after the application of the Markov random fields of the neighborhood layer of the segmentation hierarchy (right).

After a series of mathematical derivations, the net effect is that the prior probability becomes decomposed into a product of a singleton prior and a neighborhood prior. The segmentation module implements a mean field approximation as the method for optimizing the MRF. This can be conceptualized as similar to smoothing the tissue probabilities a posteriori such that an image element that appears unlike its neighbors can nevertheless be classified to belong with its neighbors. An efficient way to propagate some higher-level information to a lower level is to embed the MRF of the second layer into the EM iterations of the first layer. FIG. 12 illustrates the effect of the neighborhood layer using three iterations of the mean-field approximation. The left frame in FIG. 12 illustrates the result of the image element analysis step, without the application of a spatially varying prior. The center frame of FIG. 12 shows the results when a spatially varying prior is included. The right frame of FIG. 12 shows the results after the inclusion of Markov random fields in the analysis.

The neighborhood layer 132 of the segmentation module 126 also corrects for partial volume artifacts in the image. Partial volume artifacts (PVA) occur when more than one type of tissue is present at a single image element site. The result is either an unclassified image element, or a misclassified image element. For example, the CT intensity value of fat straddles that of air and muscle, so an image element consisting partially of air and partially of muscle can appear like fat.

The segmentation module 126 corrects for PVA by analyzing each image element's immediate neighborhood according to the following rules-based logic. First, bone image elements with values less than the quantity of (fat's mean−(fat's standard deviation) multiplied by three) are classified as air. Next, unclassified image elements with values greater than the quantity of (bone's mean+(bone's standard deviation) multiplied by three) are classified as bone. Next, image elements on the body boundary are assigned the label of their highest-labeled neighbor. A boundary image element is defined as an image element whose classification differs from that of any of its neighbors. Next, unclassified image elements that neighbor air are classified as air. If they do not neighbor air, they are otherwise assigned to the class of their most prevalent neighbor. Furthermore, fat and bone image elements that neighbor both air and muscle are classified as air. This rule is most relevant with respect to prostatic scans where it is necessary to refine the border between rectum and air.

The third layer in the hierarchy of steps performed by the segmentation module 126 is the tissue layer 136. The tissue layer 136 effects all processing without regard to specific knowledge or analysis regarding organs, but incorporates broader context than either mere image element or image element neighborhood analysis. The tissue layer 136 uses a rules-based logical analysis applied to each voxel to correct errors made by the previous layers of segmentation. While the rules are generally described below, they can be modified based on new patient data or patient specific data (described above) acquired before, during or after treatment. The errors from the previous layers 128, 132 can result from the narrow focus of analyses performed in those layers.

The tissue layer 136 of the segmentation module 126 first refines the body ROI using the knowledge already gained from segmenting the image. For example, it is desirable to remove pockets of air that lie on the body perimeter, such as in the ears. The following steps performed by the segmentation module 126 shrink the body ROI by the air that borders it:

1) Create a mask of space by inverting the mask for the body.
2) Change the mask of space to represent only the outline, not the interior, of space (by identifying boundary image elements).
3) Find islands of air within the body using CCA.
4) Make a list of islands of air that neighbor the mask of space.
5) Construct a mask consisting of all the islands in the list of islands.
6) Subtract the mask from the body ROI.

The tissue layer 136 of the segmentation module 126 also completes the task of defining skin in the image. Skin is a tissue excluded from the earlier Bayesian classification because its CT intensity overlaps that of muscle. The segmentation module identifies skin based on its spatial location. First, all image elements that are members of the outline of the body are classified as skin, thereby forming a closed surface around the exterior of the body image. Next, any non-fat image element proximal to the surface is also classified as skin.

Figure 13:
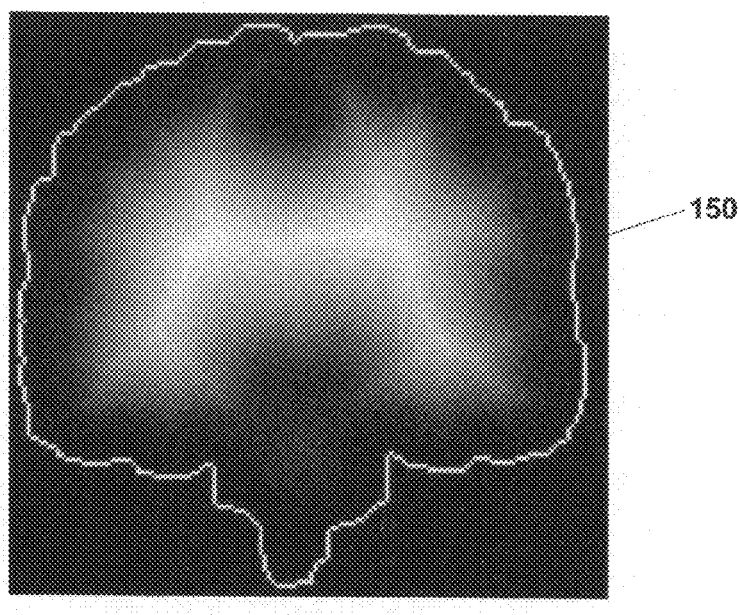
FIG. 13 is a grayscale image showing brightness of the image element as a function of the distance transform of the image element.

The identification of skin in the segmentation process is performed using distance transforms. Given a binary mask, a distance transform is computed to replace each image element's probability value with its distance, in millimeters, from the boundary of the mask, as shown in FIG. 13. The maximum distance is an algorithm parameter used to clip any distances that would otherwise extend over the maximum. In the grayscale image shown in FIG. 13, the brighter the value, the greater the image element's distance from the outline 150.

For segmenting skin, the maximum distance is set to a specified number of millimeters. Then the computation of the distance transform is followed with a threshold to generate an ROI of all image elements within the maximum distance of the surface. Next, any image elements within this ROI classified as a tissue other than fat (i.e.: air, muscle or bone) are changed to skin. Finally, CCA is employed to fill any holes inside the skin volume.

The tissue layer 136 of the segmentation module 126 next effects the step of filling bone interiors in the image. The CT intensity value of bone marrow can mimic fat or muscle, resulting in a need to fill bone interiors as follows:

First, the segmentation module 126 constructs a mask of the image elements classified thus far as bone, dilates and then erodes this mask (morphological closing operation), and uses CCA to fill any holes (image elements classified as non-bone) inside the bone regions.

Figure 14:
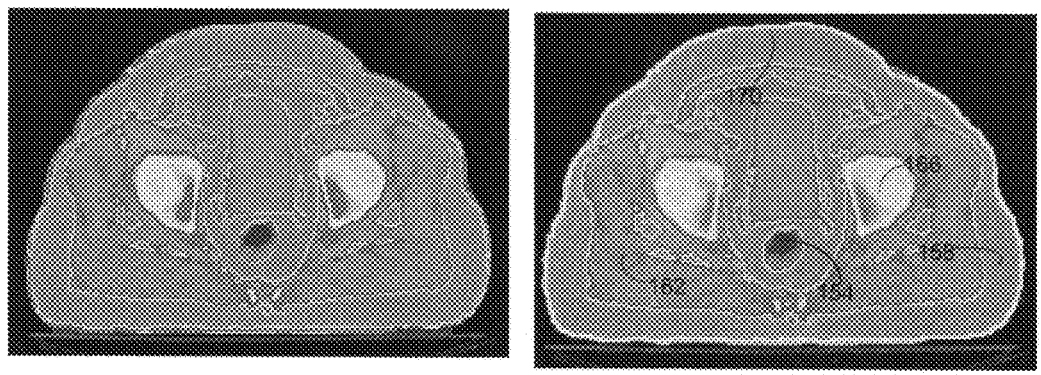
FIG. 14 shows the image after the application of the Markov random fields of the neighborhood layer of the segmentation hierarchy (left), and after the completion of the tissue layer of the segmentation hierarchy (right).

The results of the bone filling steps are shown in FIG. 14. The results after the MRF of the neighborhood layer are shown in the frame on the left in FIG. 14, and the image resulting from completion of the bone filling step of the tissue layer of the hierarchy of segmentation steps is shown in the frame on the right in FIG. 14. The right frame in FIG. 14 shows the end results as air 154, fat 158, muscle 162, bone 166 and skin 170.

Figure 24:
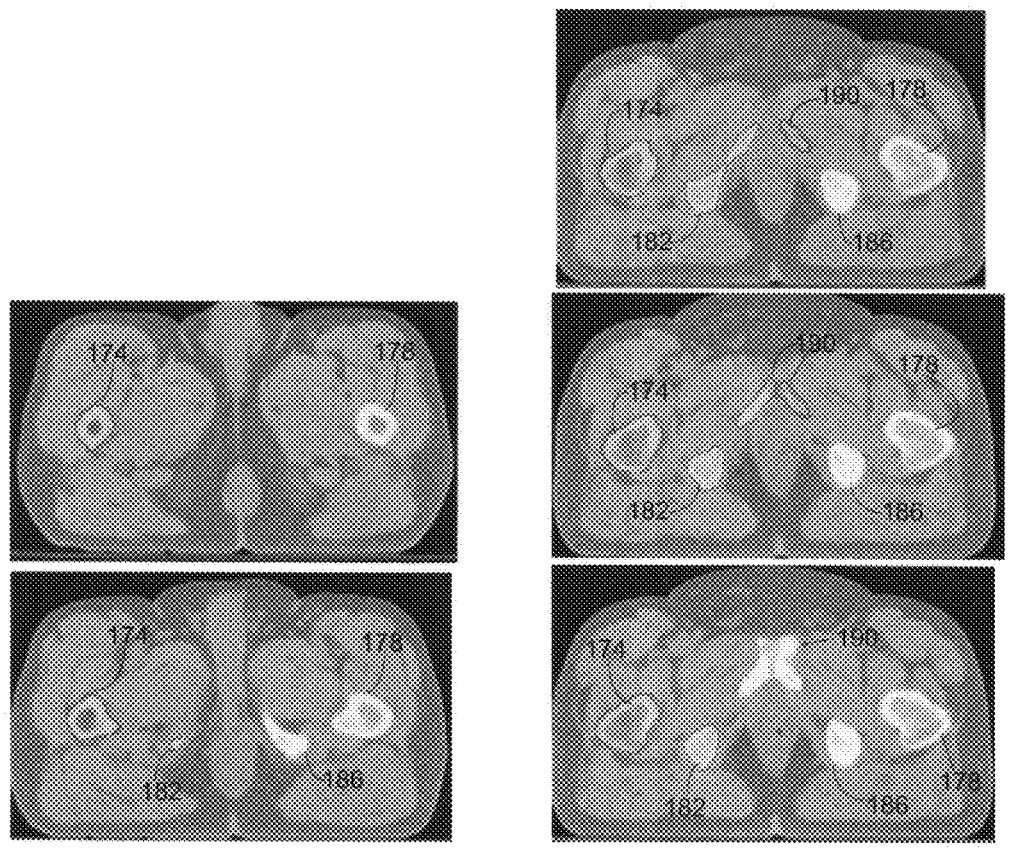
FIGS. 24-26 show the tracking of bony objects from slice to slice in the bone recognition process.
Figure 25:
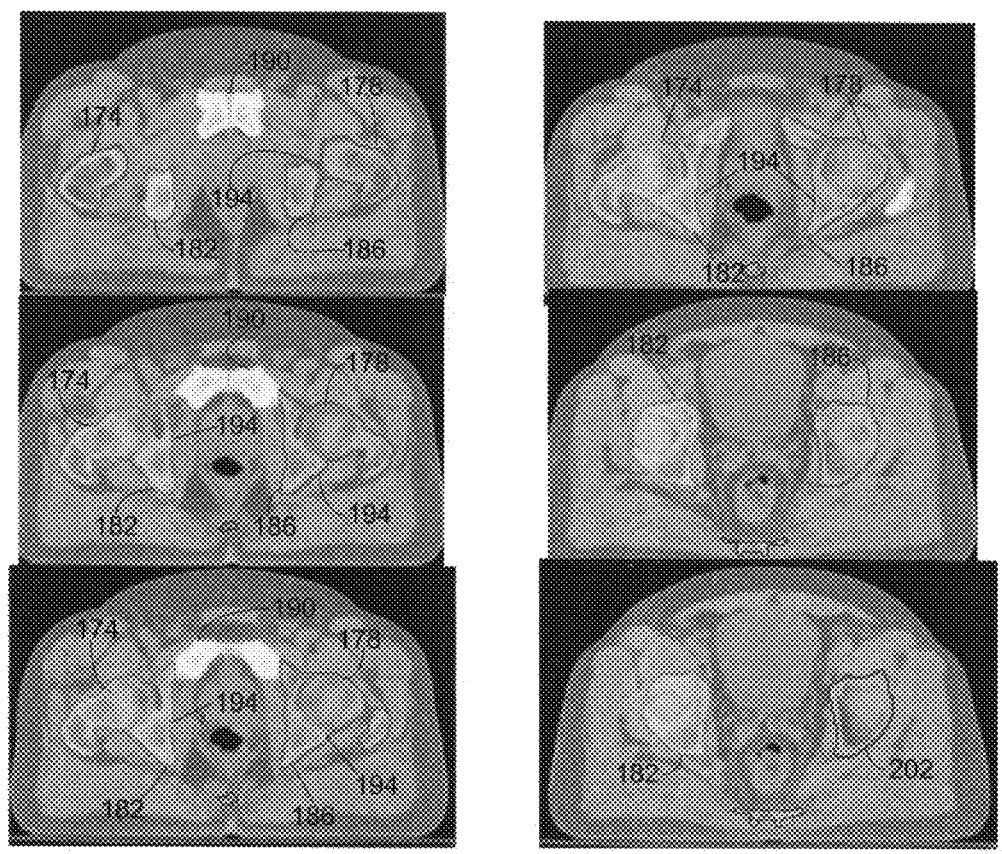
Figure 26:
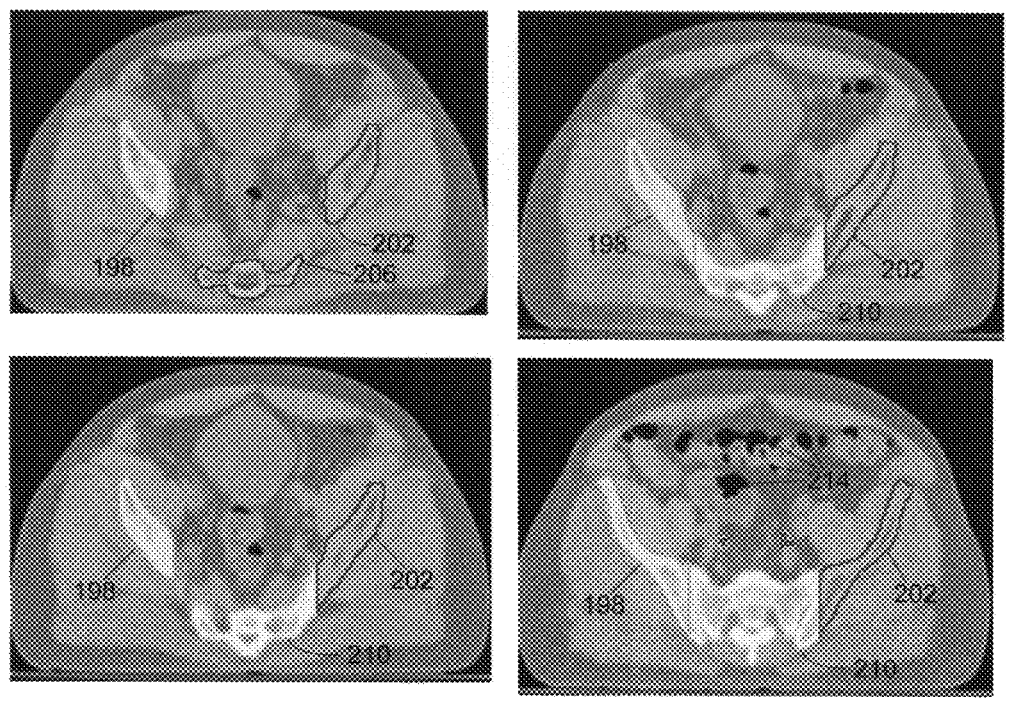

The tissue layer 136 of the segmentation module 126 next effects the step of subdividing bone tissue into various types of bone. Each voxel labeled as bone tissue is relabeled as belonging to one of a plurality of specific bones, and all non-bone voxels are left unchanged. The process of bone recognition begins on a slice where recognition can occur with high confidence, and progresses by tracking bone objects from slice to slice. The tracking process checks for overlap with the target object from the previous slice, and monitors when a certain object splits or merges with other objects. This process is illustrated generally in FIGS. 24, 25 and 26, which show a progression through the slices from the caudal end to the headward end. Referring to FIG. 24, the top left image shows initial recognition of both femurs 174, 178. In the bottom left frame, the caudal ends of the ischiums 182, 186 first appear. In the top right frame, the right ischium 186 divides into the pubis 190. In the middle right frame, both ischiums 182, 186 have divided into the pubis 190, and in the bottom right frame, the left and right pubis have merged together. FIG. 25 shows a progression of slices from where the ischium 182, 186 and femur 174, 178 merge into the hip 194 (top left) to where the ischium changes to the ilium 198, 202 (bottom right). The slides shown in FIG. 26 continue the progression where ischium 182, 186 change to ilium 198, 202, respectively, bilaterally (top left), which then connects with coccyx 206. The ilium 198, 202 turn into sacrum 210 on one side (bottom left), and then bilaterally (top right). The bottom right pane in FIG. 26 shows calcification as a series of black specks 214.

Tracking begins from an initial slice where the femurs 174, 178 can be found with the highest confidence. The segmentation module 126 must determine this slice. The module encounters a similar problem in the organ layer of the segmentation hierarchy (described later), where the module must determine the slice of a muscle, gland, or other organ on which the structure can be recognized with the highest confidence. Once the structure has been recognized on the initial slice, the segmentation propagates through the slices in one or both directions, caudal-ward and head-ward. While the details of the implementation vary for each organ, the approach is described in general here. One method is to derive the initial slice from the alignment with the anatomical atlas performed earlier in the 5-layer segmentation hierarchy. For example, the scope of the anatomical atlas for prostatic cases can be defined such that the caudal-most (anatomically inferior) slice contains cross-sections of the femurs. Another method is to derive the initial slice from landmarks. For example, the abdominal muscles can be easily recognized from their position anterior to the must superior slice of the pubis bone, and they can be propagated head-wards from that slice. Another method is to search for the initial slice by roughly segmenting every potential slice, and then assigning a confidence score to each one, and selecting the slice with the highest confidence. For example, the slice on which the prostate has the largest and simplest cross-section to segment is expected to lie within the vicinity of the slice on which the left and right pubis bones both merge with the left and right ischium bones (as depicted in the lower left frame of FIG. 25). However, it is not always that exact slice, so a range of slices must be considered. The confidence score for a given slice is computed as the probability that the roughly segmented object on that slice is in fact the target structure. To compute this probability efficiently, we define certain features, or identifying characteristics, of the structure. Features may include the structure's position, area, aspect ration, orientation, or how well an ellipse can be fit to it. Each feature has a likelihood associated with it. A likelihood is a probability distribution function (PDF) that expresses the probability of feature values given that an object is the structure of interest. Based on Baye's rule, the probability that an object is the structure of interest can then be expressed as being proportional to the product of the likelihoods. The likelihood PDFs can be determined either from empirical estimation, or from measurements of manually segmented training data.

Figure 17:
FIG. 17 shows the process of using landmarks to construct the target structure, along with a plot of scores showing the confidence score of each slice.
Figure 17:
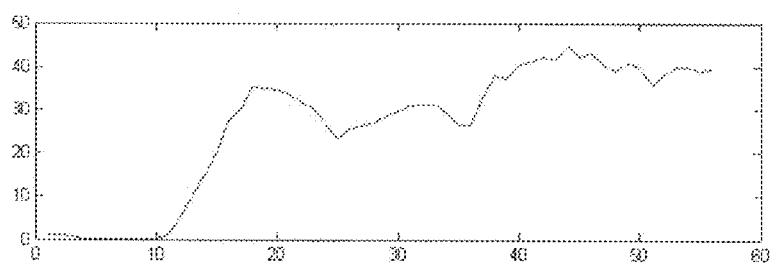

Consider applying this method to the problem of finding the initial slice for femur tracking. In this case, we choose the features to be the object's area, aspect ratio, angle of rotation, and how elliptical the object is. The likelihood PDFs are Gaussian distributions measured from several manual segmentations. FIG. 17 depicts slices with low (right side) and high (left side) probabilities. The top image in FIG. 17 shows the boney object 216 and the fitted ellipse 218. The slice on the left scores much higher than the slice on the right with respect to matching the expectation for the middle of the femur bone. The bottom portion of FIG. 17 illustrates a plot of the confidence scores across slices, from superior to inferior. Once found, this "initial femur slice" is stored in the information file to later restrict processing that need not extend inferiorly beyond this slice, i.e., to other slices. When this method is applied to other organs besides femurs, every slice but the "best fit" slice is re-segmented by propagating information caudalward or headward from the "best fit" slice in order to progress from a region where there is a high degree of confidence in the segmentation toward regions where there is more uncertainty.

After the step of bone tracking is complete (see FIG. 26), any remaining bone tissue is compartmentalized into either pelvis or specks. Specks are any boney objects less than one cubic centimeter in volume. These are candidates for possible later classification as implanted fiducial markers.

Figure 27:
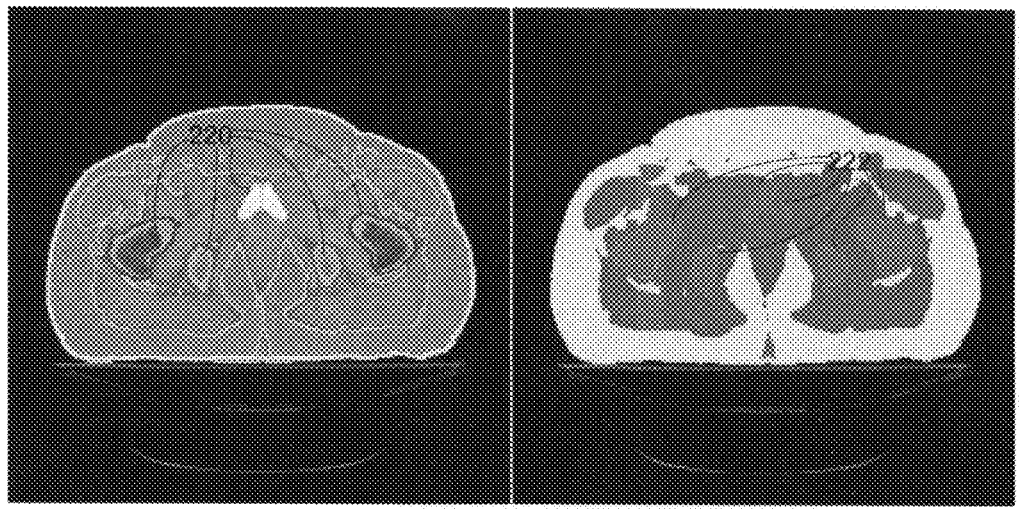
FIGS. 27-29 show steps in the process of recognizing bony structures.

Following the recognition of bones, the boundaries of bones can be better delineated. This is accomplished by fitting an active contour (or deformable three-dimensional mesh) that seeks to fit a smoothly curving border. This process is illustrated generally in FIGS. 27-29. In FIG. 27, the left pane shows the results of recognizing generally where each object 220 lies. The right pane illustrates how the borders 222 of the bony objects change when refined.

Figure 28:
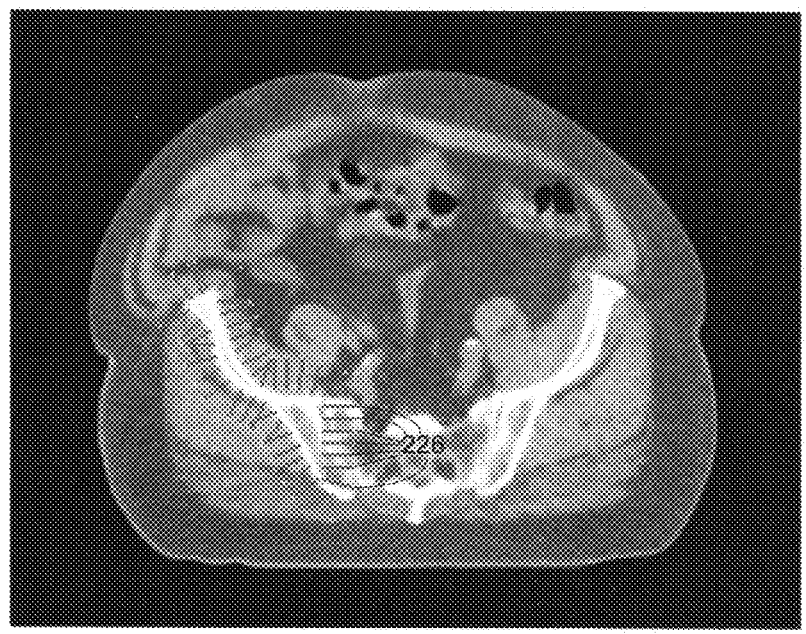

The process of bone delineation is depicted in FIG. 28. There are many different implementations of active contours known to those skilled in the art. One method is to distribute vertices at intervals along the initial contour. The initial contour is the outline of the recognized bone. At each vertex, the normal vector is computed as the unit vector oriented outward from the recognized object, and perpendicular to the contour. FIG. 28 displays the normal vectors 226 as small lines with arrowhead tips. At each iteration, the vertices move under the influence of virtual forces. The contour is required to remain closed (it can not crossover itself or break apart). After each iteration, new vertices are inserted along the contour wherever successive vertices have been stretched too far apart, and vertices are deleted whereever neighboring vertices have inched too closely together. The forces that govern the movement of vertices have internal and external components. The internal force seeks to maintain a smooth curve by minimizing its curvature. This is mathematically equivalent to directing each vertex to step inward in the reverse direction of its outwardly-oriented surface normal vector. The external force strives to drive the vertex toward features in the image. A feature can be as straightforward to compute as the magnitude of the image gradient at the voxel where the vertex is positioned. Alternatively, a feature can be defined as a profile, or a plot of CT intensities across a ray of image voxels. The lines 226 shown in FIG. 28 are actually the location of these rays that are cast in the direction of the surface normal vector. The profiles are compared, using cross-correlation, with predefined feature profiles. The features being searched for vary with the type of bone, and position along the bone's contour. Types of features can include narrow bone borders (a sharp peak in intensity along the profile), broad borders (a wide peak), or stepped borders (a step function). Besides finding features, the strength of the features found is also computed. Two factors affect strength: the degree of the correlation, and the proximity of the feature. The strength of the feature impacts the weighting assigned to the external force relative to that weight given to the internal force. In the extreme case of finding no image features, smoothness becomes the only driver.

Figure 29:
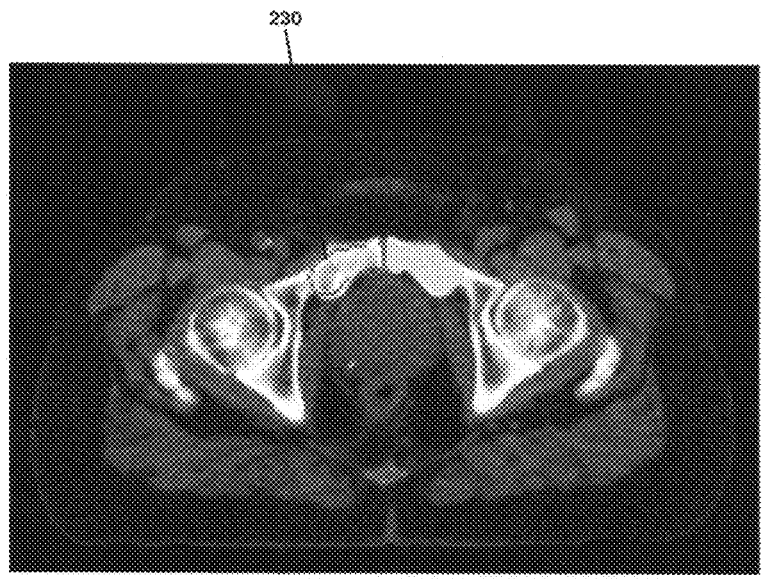

Some contours, or meshes, adapt simultaneously. In FIG. 29, the contour 230 for the pubis bone on the left adapts for one iteration while being forbidden from stepping on the contour 230 for the pubis bone on the right. Then, the two roles reverse such that the contour on the right cannot step on the region on the left. This process repeats for each iteration.

Following bone delineation, the final step of the tissues layer 136 is to re-execute the first two layers 128, 132 within the non-bone tissue. This accomplishes two goals: it classifies the voxels formerly believed to be bone, and it can marginally improve results because the hidden variables (tissue classifications) of the EM algorithm become better understood. If processing time is an issue, the re-running of the first two layers could be restricted to occur only within those voxels whose classification was originally bone until corrected by the step of bone border delineation.

As context spreads from local (the voxel layer 128) to general (the systems layer 144) (FIG. 5), the computational complexity of the segmentation process increases exponentially. As each successive layer of the segmentation hierarchy increases in the scope of analysis, it also decreases the number of pieces of information entertained from each image element. For example, the image element layer 128 considered the CT scan intensity, atlas scan intensity, and per-class atlas spatially varying prior (SVP) probabilities. The neighborhood layer 132 added the per-class a posteriori probabilities but dropped the atlas and intensity information from consideration. The tissue layer 136 continued the trend by ceasing, for the most part, to consider the probabilities in favor of focusing on the tissue class labels.

The fourth layer in the hierarchy of steps performed by the segmentation module 126 is the organ layer 140. Like the tissue layer 136, the organ layer 140 also focuses attention on the tissue class labels. The organ layer groups different voxel classifications together to form or recognize organs, such as, for example, combining air and muscle to form the interior of the rectum. The organ layer 140 can also divide a single tissue into different organs or parts of organs, such as separating hip bone into hip ball, femur, and ischium. The initial goal of the organ layer 140 is not to precisely determine the organ boundaries, but rather to perform the step of recognition in order to set the stage for boundary delineation.

Figure 15:
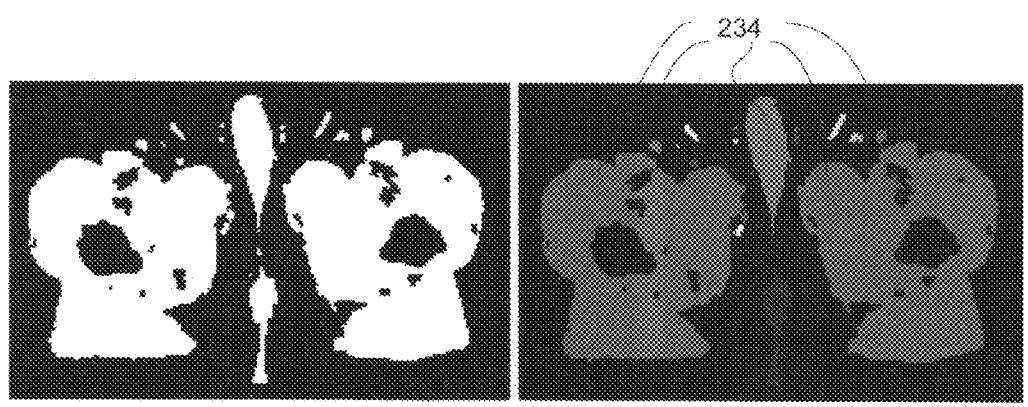
FIG. 15 shows the image of muscle tissue before connected component analysis (left) and after connected component analysis (right) wherein each connected component is uniquely colored.

One of the steps in the organ layer 140 is to fit geometric primitives to image objects. Recall that the output of CCA is an image where each connected component, or "island" has been assigned a unique label. As shown in FIG. 15, the muscle tissue, once extracted from other tissues (shown in the frame on the left in FIG. 15) is analyzed by CCA to color each connected component (or island, or object) 234 uniquely (shown in the frame on the right in FIG. 15). These islands are referred to as image objects. Rules-based logic is applied to perform reasoning based on properties of these islands. These properties include situational properties and quantitative measures. Examples of situational properties include the position of an image object relative to other image objects, and the relative positions vis-à-vis other image objects to establish which image objects are neighbors. Examples of quantitative measures include area, length, perimeter, and mean of the image objects. Other parameters could also be used.

In order to perform recognition as opposed to just delineation, it is necessary to maintain a "big picture" perspective and avoid becoming distracted by the fine details. Therefore, the segmentation module 126 smoothes over the particulars by fitting shape models to the image objects. The shape models are composed of one or more geometric primitives including circles, ellipses, solid circles, solid ellipses, solid ellipsoids, solid quarter-circles, lines, etc. There are various techniques for achieving this smoothing.

A first example is fitting a solid ellipse or ellipsoid to an object based on performing principle component analysis (PCA) on the coordinates of its member image elements. Another example is fitting a hollow ellipse to the boundary of an object. Another example is fitting a circle or sphere limited to the interior of an image object by computing the distance transform of the image object, and then finding the image element with the maximum distance value, which is the image element's radius. Its location is the center of the circle or sphere. Yet another example is fitting an ellipse limited to the interior of an image object by initializing it to the interior circle, and then iterating twice a search through a range of possible angles on [90, −90]. For each angle, the process steps along the major axis of the ellipse from the center to find the boundaries in either direction, shifting the center to the midpoint, and repeating along the minor axis of the ellipse. Yet another example is fitting a line by extracting the square bounding box around the image object, rotating this region by each permissible angle, projection along a coordinate axis, and measuring its quality. Yet another example is fitting a line by linear regression.

In another embodiment, if more degrees of freedom are desired than what are offered by simple geometric primitives, then more complex object parameterizations may be utilized, such as splines, snakes, and level set methods incorporating shape-based priors.

At this stage in the process, the knowledge accumulated over the course of the image segmentation process is more than just a collection of tissue class labels for each image element. For example, there is an atlas component called the organ region of interest (ROI). To generate it, for each organ, the segmentation of that organ is converted to a binary mask. The masks of every scan in the training set are overlayed to complete the organ ROI. The so computed organ ROI is useful for restricting where to search for each organ. There are also the probability distributions estimated from the M-step, the a posteriori probabilities calculated by the Bayesian classification, several intermediate ROIs that are computed in real-time or "on the fly" relative to landmarks in order to narrow the search space, projections of image data along coordinate axes for rapid profiling, ranges of slices for various anatomic regions, and physical coordinates of various landmarks, especially bony structures. All information that cannot be stored in image form is stored in a table that can be written to, and read from, as an ASCII file on disk. This is referred to as the information file.

Figure 16:
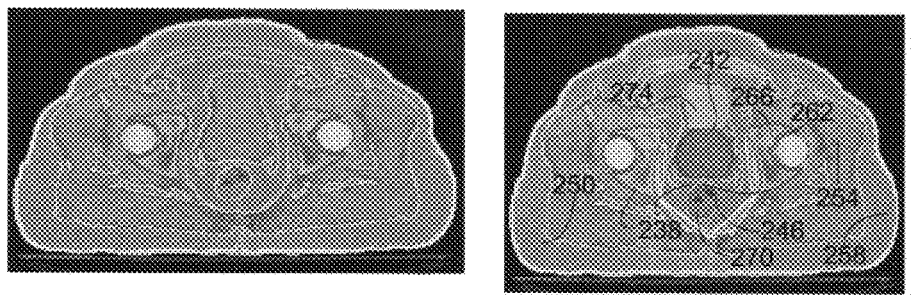
FIG. 16 shows the image after completion of the tissue layer of the segmentation hierarchy (left), and after completion of the organ layer of the segmentation hierarchy (right).

The organ layer 140 also utilizes landmarks to group tissues together to form organs. Landmarks are the scaffolding from which the target structure in the image is constructed. Organs, or parts of organs, that are not needed in the final segmentation, may be segmented as part of the process of finding the requisite organs. For example, the organ layer 140 of the segmentation module 126 segments the obturator internus 238 muscles before finding the prostate 242, as shown in FIG. 16. This avoids mistakenly allowing the prostate to "leak" laterally into these muscles. As shown in FIG. 16, following segmentation of the coccyx, levator ani muscle, left and right pelvic floor muscles, prostate, venous plexus, and penile bulb, all structures surrounding the rectum have been identified, practically reducing the problem of finding the rectum to be a process of elimination. Thus, a series of landmarks is analogous to a series of levels of scaffolding.

More specifically, FIG. 16 illustrates the results of the completion of the tissue layer 136 of the segmentation hierarchy (shown in the frame on the left) and organ layer 140 (shown in the frame on the right). FIG. 16 shows air 246, fat 250, muscle 254, skin 258, coccyx 206, hip ball 262, ischium, 182 and 186, obturator internus 238, pelvic floor 266, abdominal muscles 268, rectum 270, bladder 274, and prostate 242. The description that follows uses the prostatic region as a specific example of how the segmentation module 126 uses landmarks to construct the target structure. The same process can be used to define or construct any target structures in the image or target structures from any other imaged regions of a patient.

Although the EM segmentation of the image element layer computed the parameters governing the Gaussian distribution for the muscle tissue class, we can recompute the parameters with local precision inside any ROI as follows:

1) Refine the ROI by removing any unwanted tissues (e.g.: specks and air).
2) Compute the histogram of the CT intensity values inside this ROI.
3) Use bimodal histogram analysis to calculate a threshold.
4) Threshold to select all desired tissue inside the ROI.
5) Erode to avoid partial volume artifacts.
6) Measure the mean and variance of CT intensity values within the eroded mask.
7) Store these parameters in the information file for later use in segmenting organs and soft tissue landmarks.

In general, a similar sequence of steps is followed for recognizing each muscle and organ. While the detailed logic of each step varies for each specific organ, the general framework is as follows:

1) Generate an ROI that limits the search space.
2) Generate a field of candidate tissues with the ROI.
3) Recognize the object within the field that best matches expectations (e.g.: overlaps the object on the previous slice).
4) Fit a shape model to the object.
5) Smooth the shape parameters over all slices.
6) Refine the object boundary by reconciling shape and image data.

Figure 18:
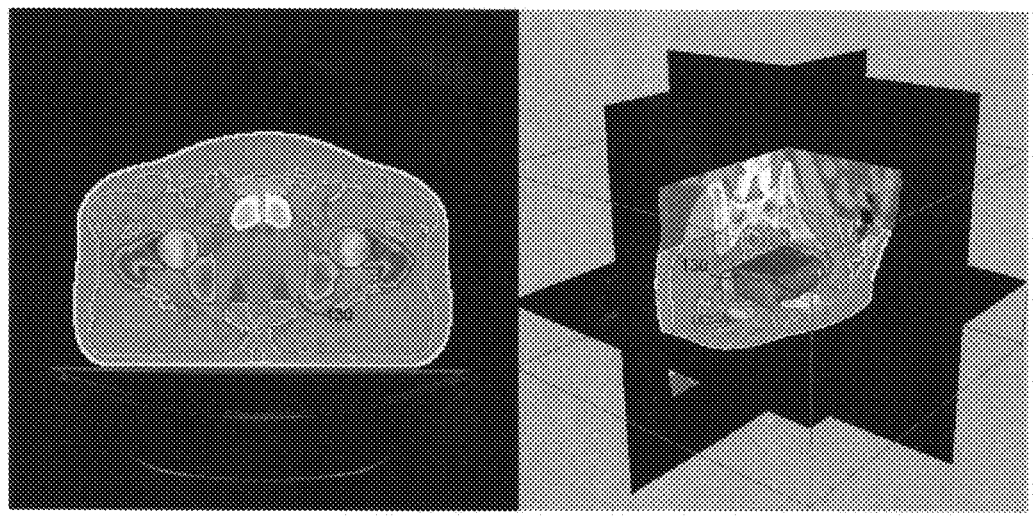
FIG. 18 is a pair of images illustrating the general region of interest ("ROI") bounded by the obturator externus muscles.
Figure 19:
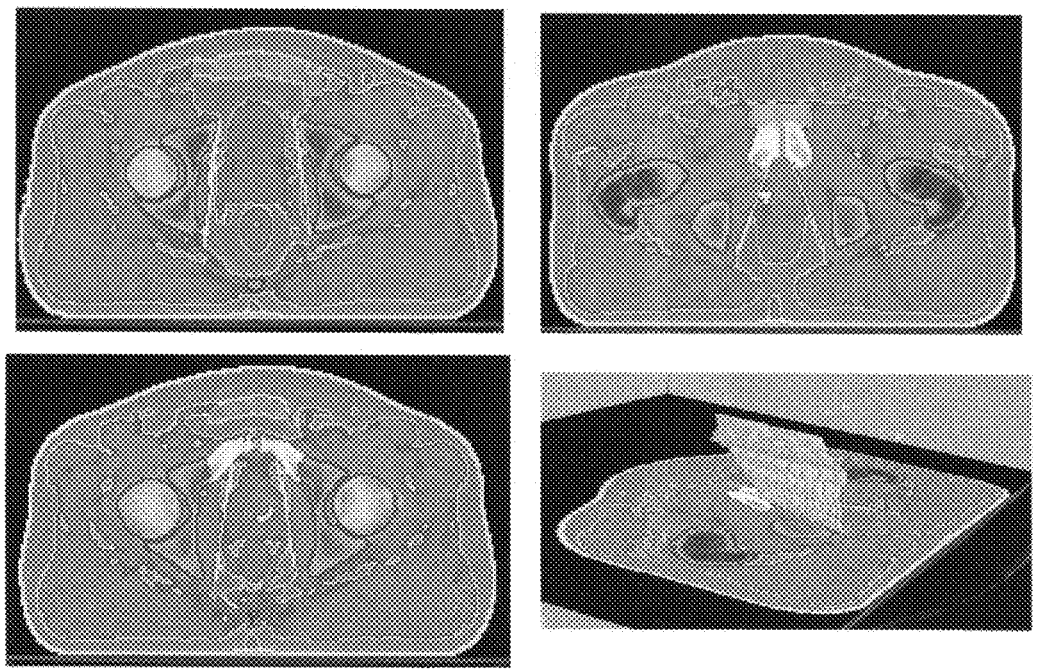
FIG. 19 is a set of images showing lines bounding the ROI fitted to tracks of fat surrounding the obturator externus muscles.
Figure 20:
FIG. 20 is a set of images showing the refined ROI.
Figure 20:
Figure 21:
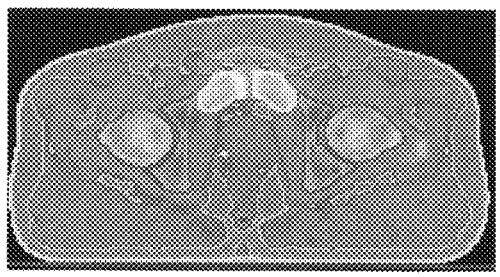
FIG. 21 is a set of images showing steps of identifying the obturator externus muscles using shapes and lines fit to the structures.
Figure 21:
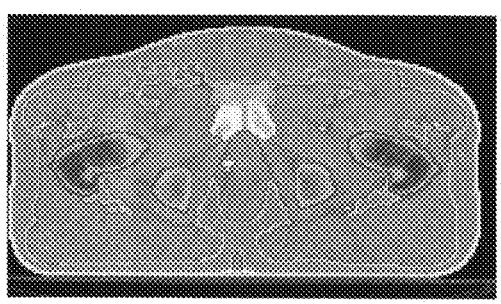
Figure 21:
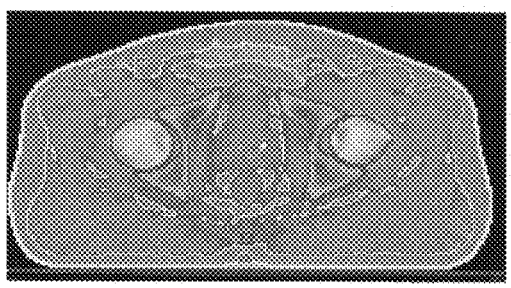
Figure 22:
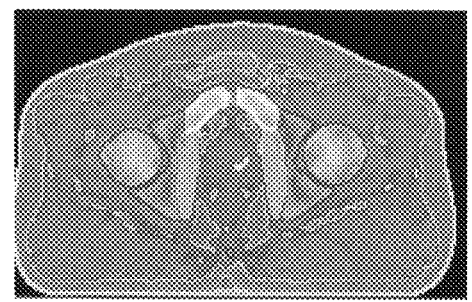
FIG. 22 is a set of images showing the relationship between the geometric shape model and the final segmentation. The top frames show the results of fitting an ellipse to the rough draft of the segmentation, and the bottom frames show the results of reconciling the draft with the shape model by refining the boundary of the segmentation.
Figure 22:
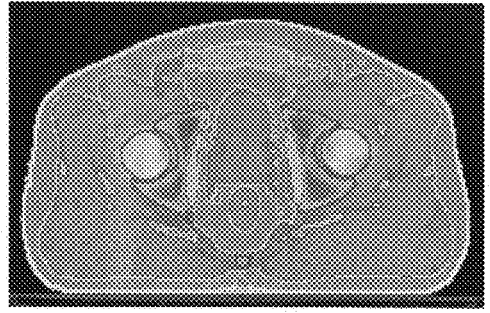
Figure 22:
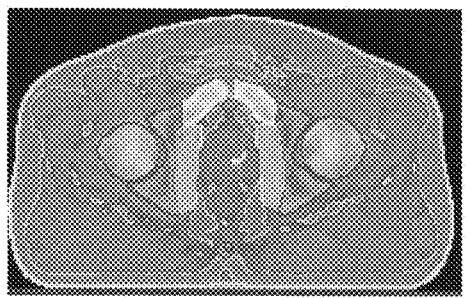
Figure 22:
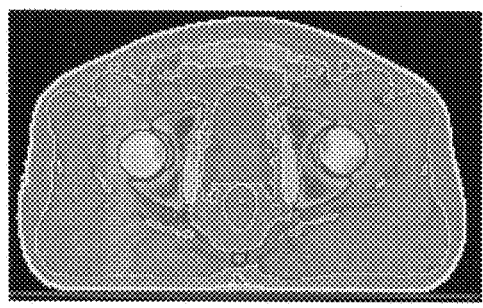

As an example of this six-step sequence, consider the obturator externus muscles that straddle the prostate. FIG. 18 illustrates the results of generating the ROI 130 which is achieved by a rules-based logical analysis. More specifically, lines 278 are drawn between tips of bones in order to bound the ROI on all sides by either bones or lines. One line connects the bottom of the right ischium bone to the bottom of the left ischium. A second line connects the top of the right ischium to the bottom of the right pubis bone. A third line connects the top of the left ischium to the bottom of the left pubis. The next step is to subdivide this singe ROI into two bilateral ROIs. To accomplish this, we seek to draw lines that separate the muscles from the prostate in instances when the structures appear to intersect. For robustness, we draw these lines using two different methods, and then combine results. First, lines are drawn between bony landmarks in the same manner that muscle tissue is expected to connect the bones, as depicted for various slices in FIG. 19. On slices where the pubis 190 does not exist, a line 282 is drawn to connect the top inner tip of ischium 182, 186 to a point found by beginning a the bottom inner tip and stepping inwards until the boundary between muscle and fat is found. On slices where the pubis 190 does exist, the top vertex of the line is the center of the underside of the pubis 190 instead of the top inner tip of the ischum 182, 186. In order to improve robustness, an alternative method for drawing lines is also performed by fitting lines 294 to the thin tracts of fat that tend to somewhat isolate these muscles from the prostate. These fitted lines 294 are shown in FIG. 20, and they are found by searching the CT image for lines along which the sum of voxel elements traversed is minimal. Smoothness in the lines' parameters (position and orientation) is enforced across slices, which helps resolve ambiguous situations. The two types of lines are combined by using the most lateral line in any row to produce the result shown in FIG. 21. Within this ROI, a shape model (in this case, an ellipse, but in other cases, any of various two-dimensional or three-dimensional geometric shapes) is fit to the muscle tissue. This operation is performed separately on each slice, and then the ellipse parameters are smoothed over all slices, producing the results shown in the top frames of FIG. 22. Finally, the muscle borders are refined by extending the elliptical border slightly whenever an edge between muscle and fat/bone tissue is nearby as shown in the bottom frames of FIG. 22. The final results are not entirely elliptical.

Figure 32:
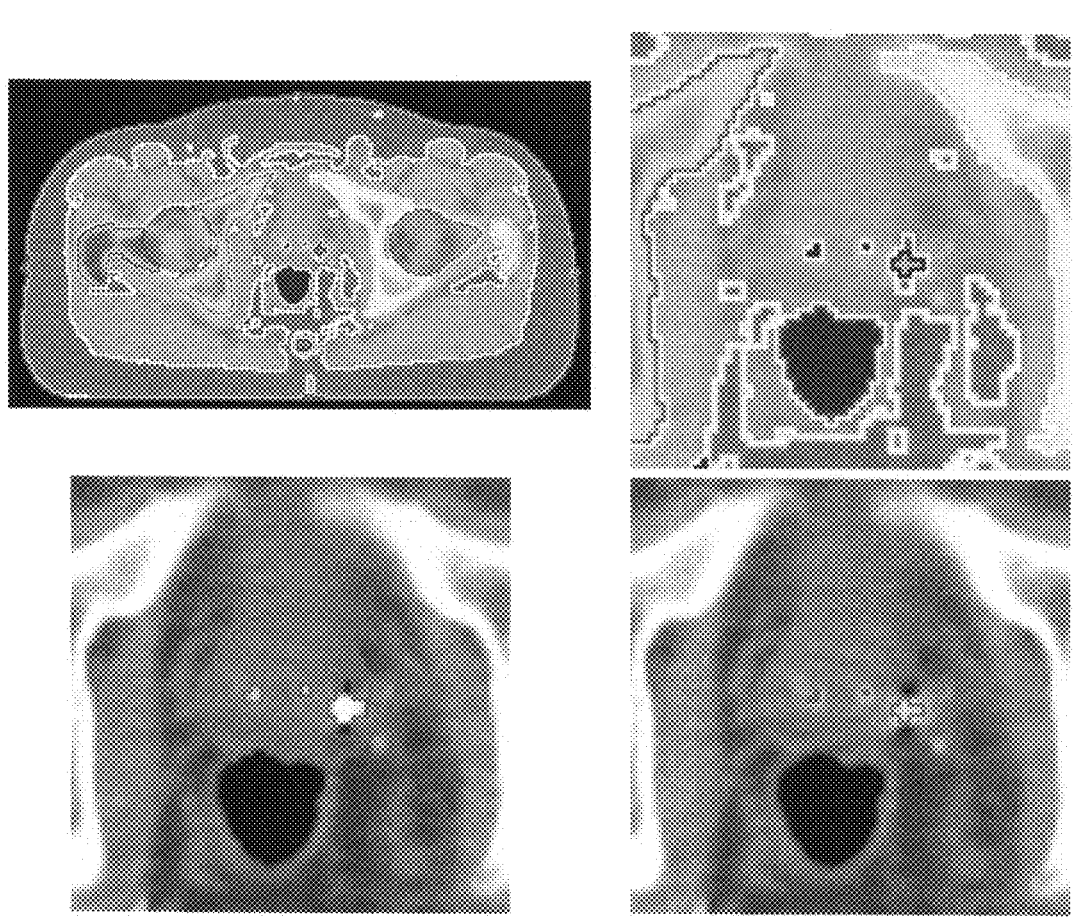
FIGS. 32-37 generally show the results of various steps in the organ layer of the hierarchy.
Figure 33:
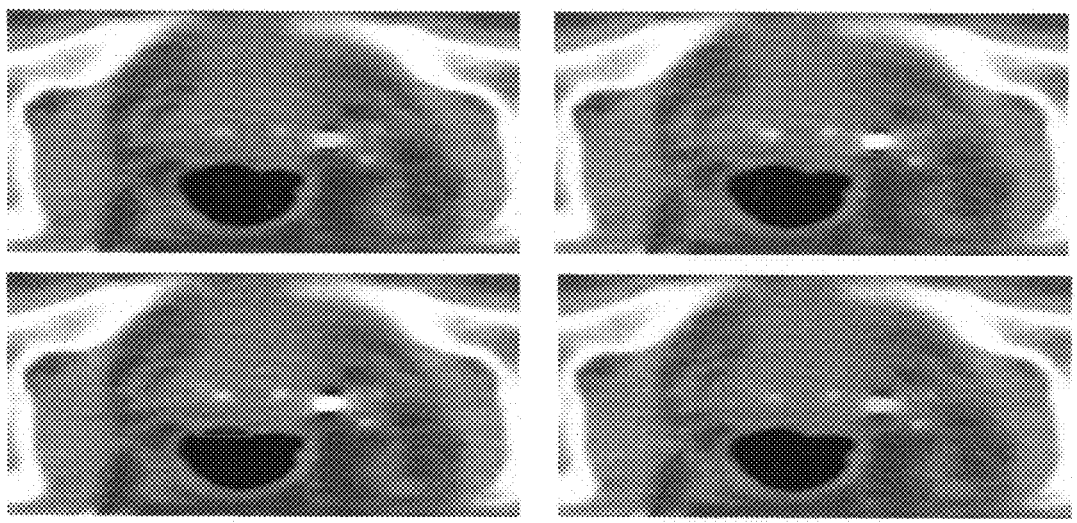

Consider how step two for organs (generate a field of candidate tissues) is accomplished when the organ is the prostate. For many organs/muscles, this step is as simple as selecting all voxels within the ROI labeled "muscle" from the tissue segmentation. However, prostate tissue is complicated by the presence of implantable fiducial markers, called "seeds", and the image artifacts, called "signal voids", they produce. The seeds where labeled "bone specks" by the tissues layer of the hierarchy. This is visible in the top frames of FIG. 32. which show the results of the tissues layer for the complete slice (top left frame) and close-up (top right frame). Simply selecting the muscle tissue within the ROI would result in the incorrect segmentation shown in the bottom left frame of FIG. 32. Therefore, all seeds within the ROI are selected from the tissue segmentation, as shown in the bottom right frame of FIG. 32. Then these are dilated to create a region in which to expect signal voids, as shown in the top left frame of FIG. 33. Within this special "Void-ROI", thresholding is performed to identify the voids, as shown in the top right frame of FIG. 33. Also, any tissue labeled "air" within this Void-ROI is switched to "void". Air within the organ ROI, but outside the Void-ROI is selected and dilated so that air in the rectum is excluded from consideration, as shown in the bottom left frame of FIG. 33. Finally, the prostate "field" is computed as shown in the bottom right frame of FIG. 33. as: Muscle+Seeds+Voids−Air.

Figure 30:
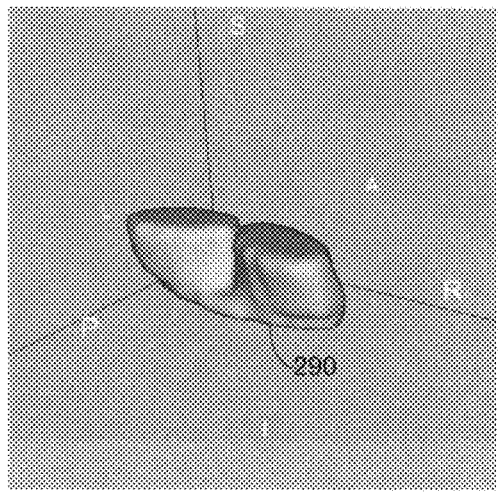
FIGS. 30 and 31 illustrate a 3-dimensional surface structure (left frame) and a virtual triangular mesh (right frame) for defining the three-dimensional structure.
Figure 31:
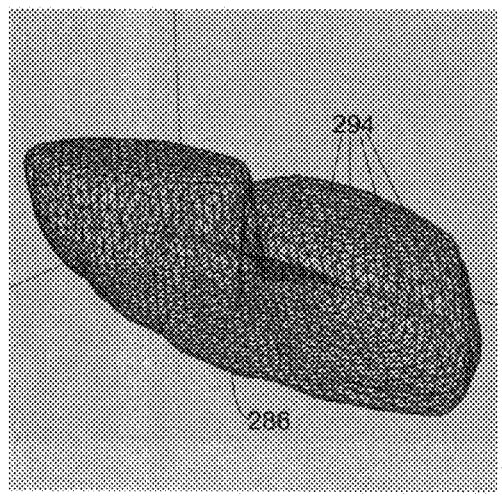

In another embodiment, steps four, five and six of the organ layer as described above are replaced with fitting an anatomical mesh 298 (FIG. 31) to the image elements based on the probabilities calculated for each image element to establish an expected shape of an organ 302 (FIG. 30). The anatomical mesh is a virtual model that represents the structure of an organ or other anatomical structure. It is built by gathering information from a previous scan (or scans) of the same patient or other patients. The mesh does not normally include data stored for each image element in the mesh. Rather, in the preferred embodiment, only data representing the mesh vertices or control points 306 is stored. This is a much smaller data set which nevertheless neatly represents the expected shape of the organ. As shown in FIG. 31, the control points define a lattice surface of the structure. The structure is scaled to match the size of the organ and the mesh vertices (control points) are fitted to the image elements based on the probabilities calculated for each image element near one of the vertices. The control points are fitted to the segmented image by adjusting the control points based on the image elements near the control points. The mesh maintains its smoothness as it is fit to the organ, and automatically reconciles the organ boundaries. Finally, as with the anatomical atlas, the rules used to calculate the probabilities, and the rules-based logical analysis applied in the tissue layer, the mesh can be modified based on new patient data or patient specific data acquired before, during or after treatment.

Figure 34:
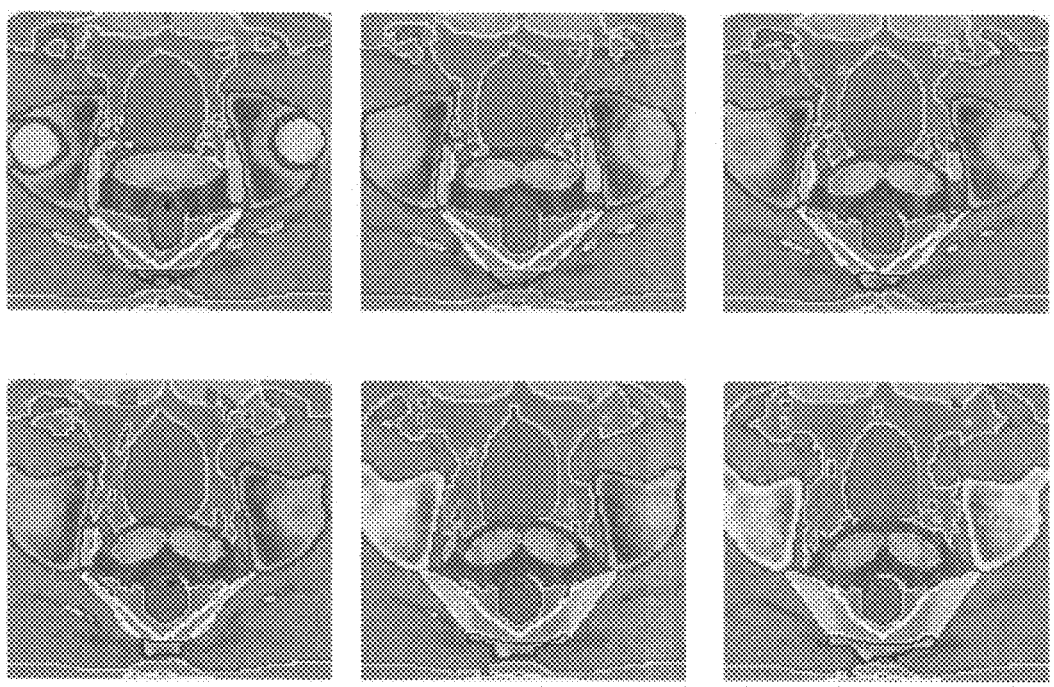

The initial mesh that is fit to the segmentation can be generated as a "mean mesh" computed by averaging a population. Alternatively, the mesh can be generated from the shape model from step four of the organ layer. The shape model is comprised of geometric primitives on each slice. For example, for bladder, rectum, and penile bulb, the model may be an ellipse. For prostate, it may be a large circle with the bottom quarter cut off, and two small side-by-side circles with radii half that of the large circle lowered by some amount into place. When not lowered, they are invisible (contained within the large circle), and when fully lowered, they extrude below the cut-off line by their radius. For seminal vesicles, the shape model may be a horizontal ellipse for the caudal-most centimeter, and then it splits into two ellipses that are permitted to tilt (inward tips move upward) and slide away from each other and downward. FIG. 34. demonstrates this on several slices. The shape model is visible as ellipses 310, and the ROI 130 from step one of the organ layer is also visible above the rectum 270. The arch is computed by fitting an averaged circle to the rectum segmentation within the expected slice range, which is two centimeters above the top of the prostate.

Figure 35:
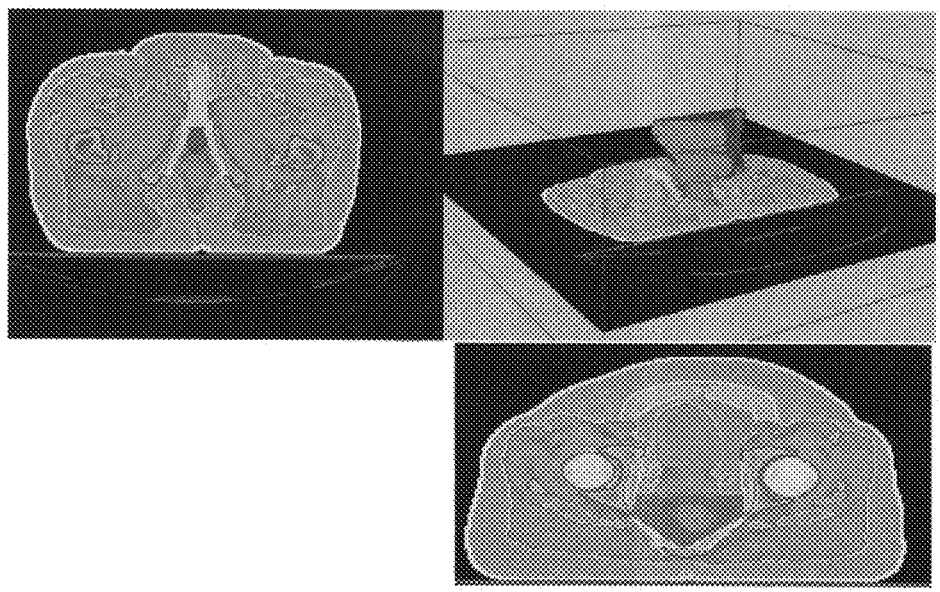
Figure 36:
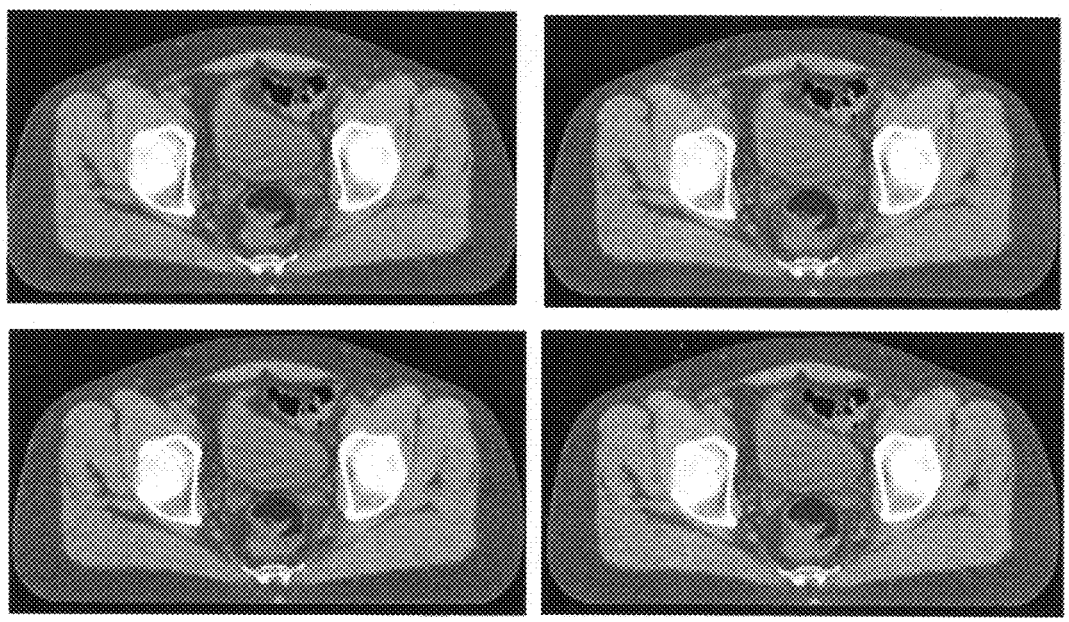
Figure 37:
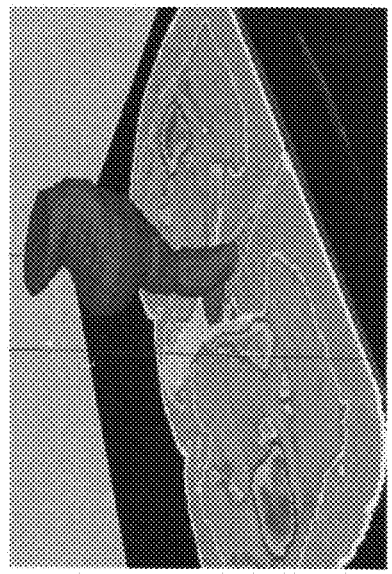
Figure 37:
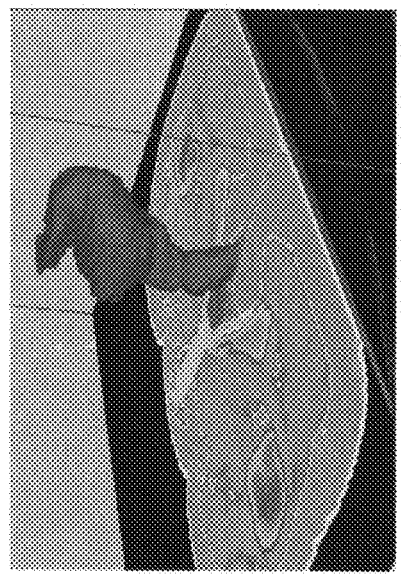
Figure 37:
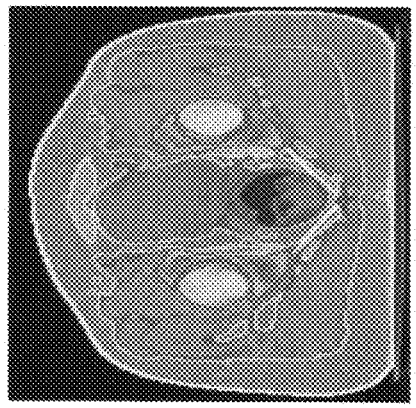
Figure 37:
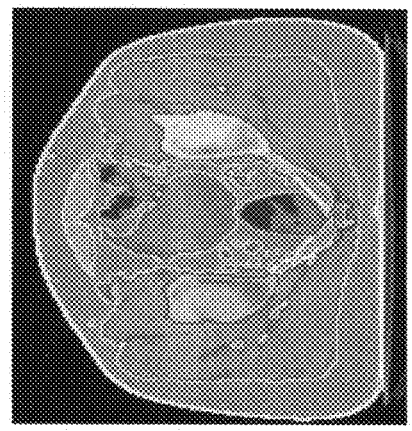
Figure 37:
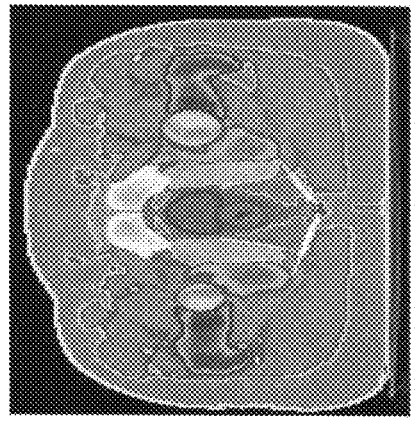
Figure 37:
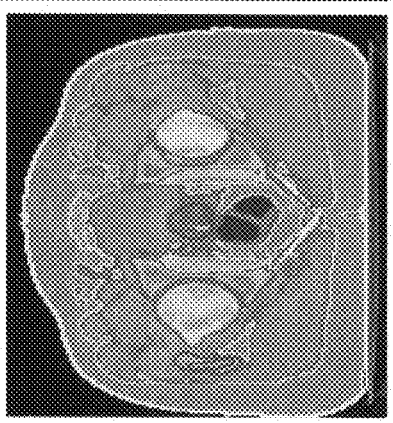

To further illustrate the function of the six steps of the organ layer, we consider the rectum as an example. The ROI 130 for step one is shown in FIG. 35. The field of candidate tissues (which are air and muscle in the case of a rectum) for step two is shown in the top left frame of FIG. 36. The object that best matches the segmentation propagated from the previous slice is shown in the bottom left frame of FIG. 36. The shape model (which is an ellipse in the case of a rectum) is shown in the top right frame of FIG. 36. The refined boundary is shown in the bottom right frame of FIG. 36. In the embodiment where a 3D mesh is substituted for steps four, five, and six of the organ layer, the utility of using the geometric shape model for the initial mesh is illustrated by FIG. 37, whose top frame shows the shape model on several slices in green, and whose bottom frame shows the final segmentation in green. On inspection, the model appears to be a reasonable starting point for a 3D surface.

In some cases, the precise boundary of the prostate, for example, is clearer on MRI, which could be fused with the CT. Even in the absence of MRI, a model that describes the expected over-segmentation of prostate from CT data can be used to correct the naïve segmentation. Another example of this situation is the spinal cord, which tends to be confused with the spinal canal by state of the art segmentation systems. There exists on the spinal cord a fairly faint outline. The segmentation module 126 detects this outline by expecting an elliptical cross section, and by performing a histogram analysis inside the canal.

Lymph nodes in the head and neck represent another example of invisible structures. The goal with these structures is not to delineate the nodes themselves, but to delineate the regions where they can be expected to reside. The strategy is to identify and delineate all structures, whether bone, muscle, or vessel, that surround the fatty tracts of interest. On a contrast-enhanced scan, the vessels appear brighter than muscle, but darker than bone. The segmentation module 126 separates these structures from bone by finding bone with a watershed approach that "grows" bone from its brightest areas. The vessels are also distinguishable by their elliptic cross-sections with continuity from slice to slice. Identification of specific vessels is necessary when establishing landmarks, such as the carotid artery and jugular vein, and this can be performed by beginning from a known origin in the lower neck relative to the trachea, and followed superiorly until bifurcation. In summary, the steps performed by the segmentation module 126 to achieve this goal are as follows:

1) Segment the vessels as nearly circular cross-sections with certain positions relative to the trachea. This vessel preprocessing prevents confusing muscle tissue with vessel tissue.

2) Distinguish landmark muscle objects by position.

3) Use landmark muscle objects to establish ROI limits, such as how far a region should extend posteriorly.

4) Add tiny spaces of fat between certain muscles to separate them in situations where the boundaries are unclear.

5) Initialize the segmentation to "required fat" in the form of the vessels and manually inserted spaces.

6) Add smoothed fat regions to the required fat. The portion of the fat border away from muscle, bone, and vessels is made smooth because it is not marked by a sharp intensity gradient.

Another example of an invisible structure is created by adding an invisible margin through "logical expansion" of the gross tumor volume (also known variously as gross target volume or GTV). GTV is typically the portion of the target ROI that can be viewed in the image. The margin added includes either the clinical target volume (CTV) or the planning target volume (PTV). CTV is the region of interest that can be seen in the image (GTV) plus some additional margin added to compensate for micro-extensions that cannot be seen in the image. The PTV is defined as the CTV plus some additional margin added to compensate for variables in setup and delivery of treatment as well as patient motion and other uncertainties. The expansion is not a "mathematical expansion", such as a dilation of the GTV segmentation by a fixed number of millimeters in all directions. Instead, bone and cartilage are recognized as barriers to a spreading tumor, while fat is recognized as a route for a spreading tumor. Also, air cavities should not be included in a CTV or PTV since treating air is pointless. In other words, anything that is air could not be a tumor.

Figure 23:
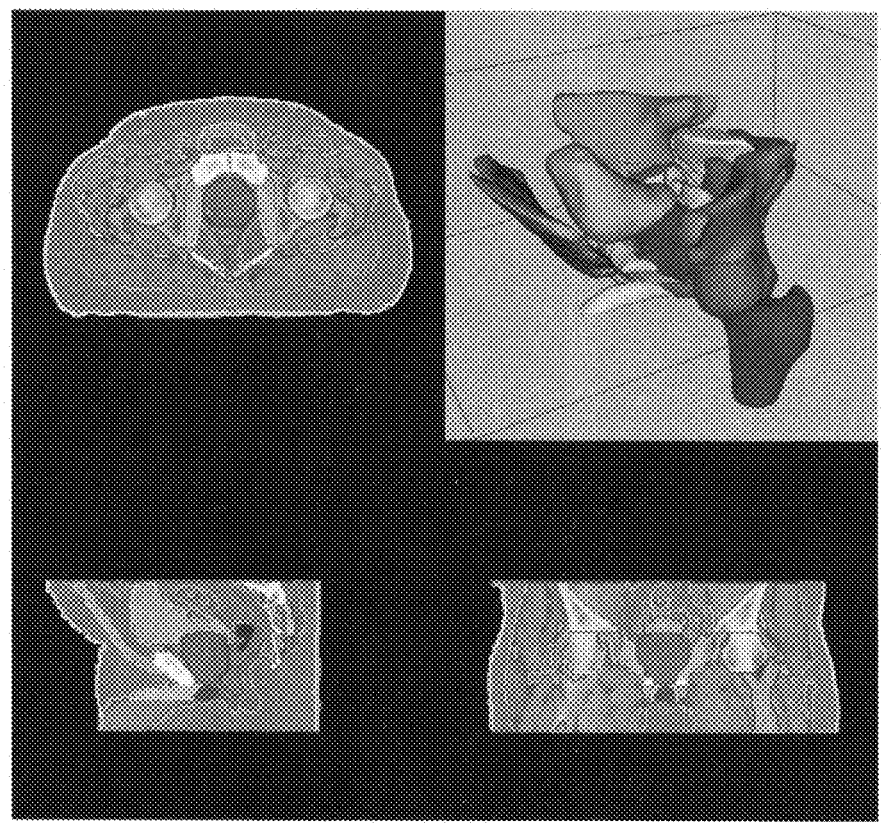
FIG. 23 is a series of images illustrating the final results of the segmentation hierarchy shown on orthogonal slice planes along with a three-dimensional image (upper right) reconstructed from the segmentation results.

The fifth layer of the segmentation hierarchy performed by the segmentation module 126 is the systems layer 144. The systems layer 144 considers organs in interaction with each other instead of organs in isolation, or just relative to landmarks. For example, after completion of the organ layer, the bladder and prostate may overlap on some slices. The classifications of boundary voxels are reconsidered by weighing the effect that a change in classification would have on the resultant shape of the organs. For example, in some prostatic cases, the bladder wall appears to have slightly brighter CT intensity values (although they all lie well within the expected range for muscle-like tissue). When a quick search for such a bright end wall fails to find this feature, the algorithm skips the rest of this step. However, if detected, the wall is followed to determine if the bladder/prostate boundary needs to be moved. Radiological correctness is favored over anatomical correctness. That is, voxels that are equally likely to belong to prostate or bladder, are classified as bladder to protect that sensitive tissue from harmful radiation. The results of this process are shown in FIG. 23 which illustrates the results of the 5-layer hierarchy for a prostate case, shown on orthogonal slice planes. The three-dimensional representation constructed from the segmentation process is shown in the upper right frame in FIG. 23.

In summary, the segmentation module 126 effects a hierarchical series of segmentation steps starting with the image element layer, which treats each image element as an independent statistical event. Bayesian classification uses an atlas in the form of a spatially varying prior constructed from training data. The classification is adaptive within an Expectation-Maximization framework that iteratively performs segmentation and model-estimation simultaneously. Next, the neighborhood layer introduces local contextual constraints using Markov random fields. Next, the tissue layer corrects mistakes using a series of logical rules. Connected component analysis groups pixels into image objects. Properties of objects are computed to support inductive reasoning. Next, the organ layer divides tissue into different organs, or stitches different tissues together to form an organ, such as combining air and muscle to form rectum. Organ cross-sections are segmented in order by quantitative confidence measures. And finally, the systems layer manipulates geometric primitives that have been fit to organs in order to reconcile overlaps.

Various features and advantages of the invention are set forth in the following claims.

What is claimed is:

1. A method of identifying anatomical structures in a patient, the method comprising:
   acquiring an image of the patient, the image comprising a set of image elements;
   segmenting the image to categorize at least some image elements according to their substance;
   aligning the segmented image to an anatomical atlas;
   computing the probability that the categorization of the image elements is correct;
   resegmenting the image emphasizing image elements based on their probabilities; and
   developing an anatomical mesh representing an anatomical structure, the anatomical mesh having a surface, and fitting the anatomical mesh to the segmented image, wherein the anatomical mesh has vertices, and wherein the fitting the anatomical mesh to the segmented image is based on the probabilities of the image elements near the vertices.

2. A method as set forth in claim 1 wherein the anatomical atlas is a probabilistic atlas.

3. A method as set forth in claim 1 and further comprising modifying the atlas based on data relating to the patient.

4. A method as set forth in claim 1 wherein the computing the probability that the categorization is correct further comprises using rules based logic to determine the probability of each image element being correctly categorized.

5. A method as set forth in claim 4 and further comprising modifying the probabilities based on data relating to the patient.

6. A method as set forth in claim 1 wherein the developing an anatomical mesh representing an anatomical structure, the anatomical mesh having a surface, and fitting the anatomical mesh to the segmented image further comprises developing a virtual surface representing an anatomical structure, the surface being governed by control points, and fitting the surface to the segmented image by adjusting the control points based on the image elements.

7. A method as set forth in claim 6 wherein the fitting the surface to the segmented image by adjusting the control points based on the image elements is based on the probability of the image elements.

8. A method as set forth in claim 1 and further comprising manually editing the segmentation, computing a difference between the initial segmentation and the manually edited segmentation; and incorporating the difference into the initial segmentation to create a revised segmentation.

9. A method as set forth in claim 1 wherein the image element comprises a voxel.

10. A method as set forth in claim 1 and further comprising using rules-based analysis to infer the position of non-anatomical structures based on the known position of anatomical structures.

11. In a radiation therapy system, a method of automatically identifying anatomical structures in a patient, the method comprising:
acquiring an image of the patient;
segmenting the image using a hierarchical series of image processing steps to identify landmarks in the image; and
identifying the anatomical structures using the landmarks, wherein the identifying the anatomical structures using the landmarks further comprises establishing a region of interest known to contain an anatomical structure by drawing lines between landmark structures, recognizing candidate tissues within the region of interest, segmenting a rough draft of the region of interest, fitting a shape model to the draft, smoothing the shape model parameters and reconciling the draft with the shape model to determine the borders of the anatomical structure.

12. A method as set forth in claim 11 wherein the shape model is an ellipse.

13. A method as set forth in claim 1 wherein the shape model is an anatomical mesh.

14. A method as set forth in claim 11 wherein the landmarks represent substantially the entire structure of a muscle or bone.

15. A method as set forth in claim 11 wherein the image comprises a set of three-dimensional image data divided into a series of two-dimensional image slices.

16. A method as set forth in claim 15 wherein each image slice comprises a group of image elements, and wherein the segmenting the image using a hierarchical series of image processing steps further comprises analyzing each image element to determine a probable tissue class, and analyzing each image element relative to neighboring image elements to confirm or modify the probability.

17. A method as set forth in claim 16 wherein the segmenting the image using a hierarchical series of image processing steps further comprises classifying image elements into tissue groups.

18. A method as set forth in claim 17 wherein the segmenting the image using a hierarchical series of image processing steps further comprises identifying organs, glands, muscles or nodal regions based on the tissue groups.

19. A method as set forth in claim 18 wherein the segmenting the image using a hierarchical series of image processing steps further comprises identifying systems based on the organs, glands, muscles or nodal regions and refining the image in response to the systems.

20. A method as set forth in claim 11 wherein the shape model is at least one geometric primitive.

21. A method of segmenting an image of a patient to identify the tissue class of each image element in the image, the method comprising:
analyzing each image element using a set of rules to determine a probability of each image element being a given tissue class;
aligning an anatomical atlas to the image;
refining the tissue probabilities of each image element based on the atlas; and
fitting a mesh to the image elements based on the probabilities, the mesh representing a structural model of an organ and establishing an expected shape of an organ.

22. A method as set forth in claim 21 wherein the anatomical atlas is a probabilistic atlas.

23. A method as set forth in claim 21 wherein the anatomical atlas is derived from a large volume of scanned images.

24. A method as set forth in claim 21 wherein the anatomical atlas comprises a single template scan.

25. A method as set forth in claim 21 wherein the image element is a voxel.

26. A method as set forth in claim 21 and further comprising modifying the rules based on patient data.

27. A method as set forth in claim 21 and further comprising modifying the mesh based on patient data.

28. A method as set forth in claim 21 and further comprising modifying the anatomical atlas based on patient data.

* * * * *